(12) United States Patent
Lee et al.

(10) Patent No.: US 10,114,414 B2
(45) Date of Patent: Oct. 30, 2018

(54) BAND MOUNTING STRUCTURE AND WEARABLE ELECTRONIC DEVICE INCLUDING THE SAME

(71) Applicant: Samsung Electronics Co., Ltd., Gyeonggi-do (KR)

(72) Inventors: Kyung-Hwan Lee, Seoul (KR); Jin Yong Kim, Gyeonggi-do (KR); Hyungwoo Lee, Seoul (KR); Seungyeon Kim, Gyeonggi-do (KR); You-Sub Shim, Gyeonggi-do (KR); Jong-Chul Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/861,316

(22) Filed: Jan. 3, 2018

(65) Prior Publication Data

US 2018/0188772 A1   Jul. 5, 2018

(30) Foreign Application Priority Data

Jan. 3, 2017   (KR) .......................... 10-2017-0000649

(51) Int. Cl.
  *G06F 1/16*   (2006.01)
  *H05K 5/00*   (2006.01)
  (Continued)

(52) U.S. Cl.
  CPC ............ *G06F 1/163* (2013.01); *G04G 17/045* (2013.01); *G04R 60/12* (2013.01); *G06F 3/016* (2013.01);
  (Continued)

(58) Field of Classification Search
  CPC ...... A44C 5/14; A44C 5/147; G04B 37/0008; G04B 37/0427; G04B 37/1486;
  (Continued)

(56) References Cited

U.S. PATENT DOCUMENTS

| 2,510,938 A | 6/1950 | Boots |
| 8,477,981 B2 * | 7/2013 | Heck .................. G04G 21/06 |
| | | 381/333 |

(Continued)

FOREIGN PATENT DOCUMENTS

| CH | 703 079 | 11/2011 |
| JP | 2015-123274 | 7/2015 |

OTHER PUBLICATIONS

European Search Report dated Jul. 20, 2018 issued in counterpart application No. 18150175.0-1017, 9 pages.

*Primary Examiner* — Anthony Haughton
(74) *Attorney, Agent, or Firm* — The Farrell Law Firm, P.C.

(57) ABSTRACT

An electronic device includes a housing including a first plate, a second plate, and a side member a first band detachably mounted to the side member, and shaped to wrap around a wrist of a user; a display exposed through the first plate; a processor a memory and a mounting structure configured to connect the first band to the side member. The mounting structure includes a recessed structure formed in the side member, the recessed structure having a first surface, a second surface, a first hole formed in the first surface, and a second hole formed in the second surface, and facing the first hole, in which an imaginary line extending from the first hole to the second hole defines a first axis; a rotating member positioned to rotate around the first axis, the rotating member having a through-hole that has an inner screw surface centered around the first axis; a first rod extending along the first axis through a first portion of the first band, in which the first rod has a first end inserted into the first hole, and a second end held by the rotating member such that the first rod does not move along the first axis while the rotating member rotates; and a second rod extending along the first axis through a second portion of the first band. The
(Continued)

second rod has: a third end rotatably inserted into the second hole; and an external screw surface engaged with the inner screw surface of the rotating member such that the second rod moves along the first axis while the rotating member rotates.

20 Claims, 25 Drawing Sheets

(51) Int. Cl.
*H05K 7/00* (2006.01)
*H01Q 1/22* (2006.01)
*G04G 17/04* (2006.01)
*G06F 3/14* (2006.01)
*G04R 60/12* (2013.01)
*H01Q 1/27* (2006.01)
*G06F 3/01* (2006.01)

(52) U.S. Cl.
CPC ................ *G06F 3/14* (2013.01); *H01Q 1/22* (2013.01); *H01Q 1/273* (2013.01)

(58) Field of Classification Search
CPC ............ G04B 37/0016; G04B 37/0025; G04B 37/0033; G04B 37/0041

USPC .......... 361/679.01, 679.02, 679.03; 368/281, 368/282, 283, 313

See application file for complete search history.

(56) References Cited

U.S. PATENT DOCUMENTS

| | | | |
|---|---|---|---|
| 2002/0141775 A1* | 10/2002 | Mitsuoka | G03G 15/2042 399/69 |
| 2006/0280038 A1 | 12/2006 | Hiranuma et al. | |
| 2007/0134057 A1 | 6/2007 | Chang et al. | |
| 2007/0279852 A1* | 12/2007 | Daniel | A44C 5/0007 361/679.03 |
| 2010/0302913 A1* | 12/2010 | Loiseau | G04B 37/0427 368/281 |
| 2015/0189134 A1* | 7/2015 | Joo | G06F 1/163 348/373 |
| 2015/0241916 A1* | 8/2015 | Choi | G06F 1/163 361/679.03 |
| 2015/0277489 A1* | 10/2015 | Lin | G06F 1/163 361/679.03 |
| 2015/0346767 A1* | 12/2015 | Yang | G06F 1/1637 361/679.03 |
| 2016/0148189 A1 | 5/2016 | Jeong | |

* cited by examiner

BAND MOUNTING STRUCTURE AND WEARABLE ELECTRONIC DEVICE INCLUDING THE SAME

PRIORITY

The present application claims priority under 35 U.S.C. § 119(a) to a Korean Patent Application filed in the Korean Intellectual Property Office on Jan. 3, 2017, and assigned Serial No. 10-2017-0000649, the entire content of which is incorporated herein by reference.

BACKGROUND

1. Field of the Disclosure

The present disclosure relates generally to a band mounting structure and a wearable electronic device including the same.

2. Description of Related Art

Portable devices have come to be essential electronic devices in our everyday lives.

Such electronic devices are manufactured in various sizes and shapes, depending on their functions and user preferences. The external aesthetic appearance of the devices are considered in addition to their functions and, preferably, their slim size. Further, among electronic devices having substantially the same function as each other, electronic devices having better and more aesthetically pleasing designs are preferred by users.
In particular, wearable electronic devices can be worn on users' bodies, and they have also been improved to sufficiently perform various functions despite their limited size.

A wearable electronic device may include a housing (i.e., a main body) and at least one band (i.e., a strap, a coupler, a fastener) that is fastened to at least a portion of the housing. A wearable electronic device may be formed in a watch type and secured to a user's wrist by a band. For example, the band may be made of urethane, rubber, or silicon. The band may be composed of a plurality of unit links flexibly coupled to each other and may include a plurality of metallic or ceramic unit links.

The band may be fastened to a housing of the wearable electronic device by pins protruding through left and right sides at an end thereof. Inserting the pins is performed in order to connect the housing and the band to each other, and thus it may be troublesome to replace the band. Further, a band mounting structure has only a configuration for simply fixing/separating the band to/from the housing, so it lacks specific additional functions.

SUMMARY

The present disclosure has been made to address at least the above-mentioned problems and/or disadvantages and to provide at least the advantages described below.

Accordingly, an aspect of the present disclosure is to provide band mounting structure that allows a user to easily mount/detach a band to/from a housing through simple operation, and an electronic device having the band mounting structure.

Accordingly, another aspect of the present disclosure is to provide a band mounting structure that allows input of data into an electronic device by operating a band mounting structure fastened to a housing, and an electronic device including the band mounting structure.

In accordance with an aspect of the present disclosure, an electronic device includes: a housing including a first plate, a second plate facing away from the first plate, and a side member surrounding a space between the first plate and the second plate; a first band detachably mounted to the side member and shaped to wrap around a wrist of a user; a display exposed through the first plate; a processor positioned inside the space and electrically connected to the display; a memory positioned inside the space and electrically connected to the processor; and a mounting structure configured to connect the first band to the side member. The mounting structure includes: a recessed structure formed in the side member, the recessed structure having a first surface, a second surface facing the first surface, a first hole formed in the first surface, and a second hole formed in the second surface, and facing the first hole, in which an imaginary line extending from the first hole to the second hole defines a first axis; a rotating member positioned to rotate around the first axis, the rotating member having a through-hole that has an inner screw surface centered around the first axis; a first rod extending along the first axis through a first portion of the first band, the first rod having a first end inserted into the first hole and a second end held by the rotating member such that the first rod does not move along the first axis while the rotating member rotates; and a second rod extending along the first axis through a second portion of the first band. The second rod has: a third end rotatably inserted into the second hole; and an external screw surface engaged with the inner screw surface of the rotating member such that the second rod moves along the first axis while the rotating member rotates.

In accordance with another aspect of the present disclosure, an electronic device includes: a housing including a first plate, a second plate facing away from the first plate, and a side member surrounding a space between the first plate and the second plate; a first band detachably mounted to the side member and shaped to wrap around a wrist of a user; a display exposed through the first plate; a processor positioned inside the space and electrically connected to the display; a memory positioned inside the space and electrically connected to the processor; and a mounting structure configured to connect the first band to the side member. The mounting structure includes: a recessed structure formed in the side member, the recessed structure having a first surface, a second surface facing the first surface, a first hole formed in the first surface, and a second hole formed in the second surface, and facing the first hole, in which an imaginary line extending from the first hole to the second hole defines a first axis; a rotating member positioned to rotate around the first axis, the rotating member having a through-hole and a lever through-hole formed to the outside from the through-hole; an inner housing positioned in the through-hole of the rotating member to rotate about the first axis and having a through-hole having an inner screw surface around the first axis; a first rod extending along the first axis through a first portion of the first band, the first rod having a first end inserted into the first hole and a second end extending toward the inner housing such that the first rod does not move along the first axis while the rotating member rotates; a clutch interposed between the first rod and the inner housing, the clutch having a lever partially exposed through the lever through-hole in the rotating member, and allowing or stopping rotation of the inner housing by being selectively coupled to the inner housing in response to operation of the lever; and a second rod extending along the first axis through a second portion of the first band. The second rod has: a third end rotatably inserted into the second hole; and an external screw surface engaged with the inner screw surface of the inner housing such that the second rod moves along the first axis while the inner housing rotates.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

Figure 1:
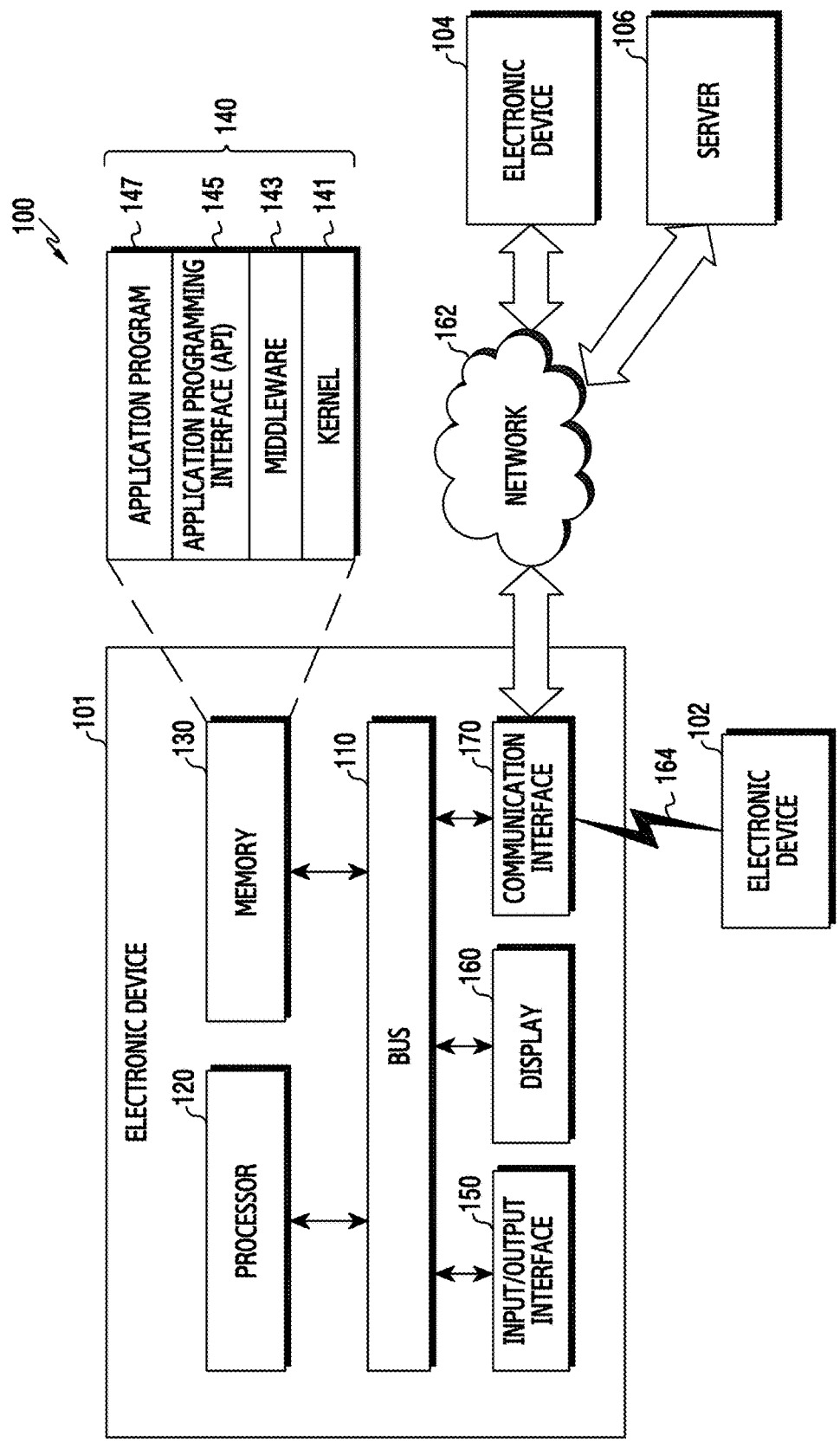
FIG. 1 is a block diagram of a network environment including an electronic device, according to an embodiment of the present disclosure.

Embodiments of the present disclosure are described in detail with reference to the accompanying drawings, in which similar reference numerals may be used to refer to similar elements. It is intended to be apparent to those skilled in the art that various changes and modifications of the various embodiments described herein can be made without departing from the scope and spirit of the present disclosure. Those skilled in the art will understand that the principles of the present disclosure may be implemented in any suitably arranged electronic device.

In addition, descriptions of well-known functions and constructions may be omitted for clarity and conciseness.

The terms and words used in the following description and claims are not limited to their dictionary meanings, but are used to convey a clear and consistent understanding of the present disclosure. Accordingly, embodiments of the present disclosure are provided for illustrative purposes only and not for the purpose of limiting the present disclosure.

Singular terms such as "a," "an," and "the" include plural references unless the context clearly dictates otherwise. Thus, reference to "a component surface" includes reference to one or more of such surfaces.

Herein, terms such as "have," "may have," "include," and "may include" indicate the presence of corresponding features (e.g., elements such as numerical values, functions, operations, or parts), but do not preclude the presence of additional features.

The terms "A or B," "at least one of A or/and B," and "one or more of A or/and B" include all possible combinations of the enumerated items. For example, "A or B," "at least one of A and B," or "at least one of A or B" means (1) at least one A, (2) at least one B, or (3) at least one A and at least one B.

Numerical terms such as "first" and "second" may modify various elements regardless of an order and/or importance of the elements, and do not limit the elements. These terms may be used for distinguishing one element from another element. For example, a first user device and a second user device may indicate different user devices, regardless of the order or importance of the devices. Accordingly, a first element may be referred to as a second element, and a second element may be referred to as a first element, without departing from the scope the present disclosure.

When an first element is "(operatively or communicatively) coupled with/to" or "connected to" a second element, the first element may be directly coupled with/to the second element, or there may be an intervening element (e.g., a third element) between the first element and the second element. However, when the first element is "directly coupled with/to" or "directly connected to" the second element, there is no intervening element therebetween.

Herein, the term "module" may refer to a unit including one of hardware, software, and firmware, or any combination thereof. The term "module" may be interchangeably used with terms, such as unit, logic, logical block, component, and circuit. A module may be a minimum unit of an integrally constituted component or may be a part thereof. A module may be a minimum unit for performing one or more functions or may be a part thereof. A module may be mechanically or electrically implemented. For example, a module may include and without limitation, at least one of a dedicated processor, a CPU, an application-specific integrated circuit (ASIC) chip, a field-programmable gate array (FPGA), and a programmable-logic device, which are known or will be developed and which perform certain operations.

All of the terms used herein, including technical or scientific terms, have the same meanings as those generally understood by a person having ordinary skill in the related art unless they are otherwise defined. Terms defined in a generally used dictionary should be interpreted as having the same or similar meanings as the contextual meanings of the relevant technology and should not be interpreted as having ideal or exaggerated meanings unless clearly defined as such herein. Even terms defined in the disclosure should not be interpreted as excluding embodiments of the present disclosure.

Examples of electronic devices include smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, and/or wearable devices, but are not limited thereto. The wearable devices may include accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), and/or implantable wearable devices (e.g., implantable circuits), but are not limited thereto.

The electronic devices may include smart home appliances, such as televisions (TVs), digital versatile disk (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, and/or electronic picture frames, or the like, but are not limited thereto.

The electronic devices may be at least one of a medical device, such as a portable medical measurement device (e.g., a blood glucose meter, a heart rate monitor, a blood pressure monitor, or a thermometer), a magnetic resonance angiography (MRA) device, a magnetic resonance imaging (MRI) device, a computed tomography (CT) device, a scanner, an ultrasonic device, a navigation device, a GPS receiver, an event data recorder (EDR), a flight data recorder (FDR), a vehicle infotainment device, electronic equipment for a ship (e.g., navigation systems or gyrocompasses), an avionics device, a security device, a head unit for a vehicle, an industrial or home robot, an automated teller machine (ATM), a point of sale (POS) device, and/or an Internet of Things (IoT) device (e.g., a light bulb, a sensor, an electric or gas meter, a sprinkler device, a fire alarm, a thermostat, a street lamp, a toaster, exercise equipment, a hot water tank, a heater, or a boiler), but are not limited thereto.

The electronic devices may also be a part of furniture, buildings/structures, an electronic board, an electronic signature receiving device, projectors, or a measuring instrument (e.g., water, electricity, gas, or wave meters), but are not limited thereto.

The electronic devices may be flexible electronic devices or combinations of the above-described devices.

Additionally, the electronic devices are not limited to the above-described devices, and may include new electronic devices according to the development of new technologies.

Herein, the term "user" may refer to a person who uses an electronic device or may refer to a device (e.g., an artificial intelligence (AI) electronic device) which uses an electronic device.

FIG. 1 is a block diagram of network environment including an electronic device, according to an embodiment of the present disclosure.

Referring to FIG. 1, the network environment includes an electronic device 101, which includes a bus 110, a processor (e.g., including processing circuitry) 120, a memory 130, an input/output interface (e.g., including input/output circuitry) 150, a display 160, and a communication interface (e.g., including communication circuitry) 170. Alternatively, the electronic device 101 may omit at least one of the illustrated components, or include additional components.

The bus 110 is a circuit for connecting the components and delivering communications such as a control message therebetween.

The processor 120 may include at least one of a dedicated processor, a central processing unit (CPU), an application processor (AP), and/or a communication processor (CP). The processor 120 processes an operation or data on control of and/or communication with the other components of the electronic device 101.

The processor 120 may also include a microprocessor or one or more general-purpose processors (e.g., ARM-based processors), a digital signal processor (DSP), a programmable logic device (PLD), an ASIC chip, a field-programmable gate array (FPGA), a graphical processing unit (GPU), or a video card controller. In addition, when a general purpose computer accesses code for implementing the processing shown herein, the execution of the code transforms the general purpose computer into a special purpose computer for executing the processing shown herein.

The processor 120 can be connected to an LTE network and may determine whether a call is connected over a circuit switched (CS) service network using caller identification information, such as a caller phone number of the CS service network (i.e., a 2G or a 3rd generation (3G) network). For example, the processor 120 receives incoming call information, such as a CS notification message or a paging request message of the CS service network over the LTE network, such as circuit-switched fallback (CSFB). The processor 120, being connected to the LTE network, receives incoming call information, such as a paging request message over the CS service network (i.e., single radio LTE (SRLTE)).

When receiving an incoming CS notification message or a paging request message of the CS service network over the LTE network, the processor 120 may obtain caller identification information from the incoming call information and display the caller identification information on the display 160. The processor 120 may determine whether to connect the call based on input information corresponding to the caller identification information displayed on the display 160. When detecting input information corresponding to an incoming call rejection, the processor 120 may restrict the voice call connection and maintain the LTE network connection through the input/output interface 150. When detecting input information corresponding to an incoming call acceptance, the processor 120 may connect the voice call by connecting to the CS service network through the input/output interface 150.

When receiving the incoming CS notification message or a paging request message of the CS service network over the LTE network, the processor 120 may obtain caller identification information from the incoming call information and determine whether to connect the call by comparing the caller identification information with a reception control list. For example, when the caller identification information is included in a first reception control list, such as a blacklist, the processor 120 may restrict the voice call connection and maintain the connection to the LTE network. When the caller identification information is not included in the blacklist, the processor 120 may connect the voice call by connecting to the CS service network. When the caller identification information is included in a second reception control list, such as a white list, the processor 120 may connect the voice call by connecting to the CS service network.

When receiving the incoming call information, such as a paging request message of the CS service network over the LTE network, the processor 120 may send an incoming call response message, such as a paging response message, to the CS service network. The processor 120 may suspend the LTE service and receive the caller identification information, such as a circuit-switched call (CC) setup message, from the CS service network. The processor 120 may determine whether to connect the call by comparing the caller identification information with the reception control list. For example, when the caller identification information is included in the blacklist, the processor 120 restricts the voice call connection and resumes the LTE network connection. When the caller identification information is not included in the blacklist, the processor 120 may connect the voice call by connecting to the CS service network. For example, when the caller identification information is included in the white list, the processor 120 connects the voice call by connecting to the CS service network.

The memory 130 may include volatile and/or nonvolatile memory. The memory 130 may store commands or data, such as the reception control list relating to at least another component of the electronic device 101. The memory 130 may store software and/or a program 140. The program 140 includes a kernel 141, middleware 143, an application programming interface (API) 145, and/or application programs 147. At least a part of the kernel 141, the middleware 143, and the API 145 may be referred to as an operating system (OS).

The kernel 141 may control or manage system resources, such as the bus 110, the processor 120, or the memory 130 used for performing an operation or function implemented by the other programs, such as the middleware 143, the API 145, or the applications 147. Further, the kernel 141 may provide an interface for allowing the middleware 143, the API 145, or the applications 147 to connect with the individual elements of the electronic device 101 to control or manage the system resources.

The middleware 143 may function as an intermediary for the API 145 or the applications 147 to communicate and exchange data with the kernel 141.

In addition, the middleware 143 may process one or more task requests received from the applications 147 according to priorities thereof. For example, the middleware 143 assigns priorities for using the system resources of the electronic device 101, to at least one of the applications 147. In another example, the middleware 143 performs scheduling or load balancing on the one or more task requests by processing the one or more task requests according to the priorities assigned thereto.

The API 145 is an interface through which the applications 147 may control functions provided from the kernel 141 or the middleware 143, and may include at least one interface or function, such as an instruction for file control, window control, image processing, or text control.

The input/output interface 150 may include input/output circuitry and function as an interface that transfers instructions or data input from a user, or another external device, to the other element(s) of the electronic device 101. Further, the input/output interface 150 may output the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, or an electronic paper display. The display 160 may display various types of content, such as text, images, videos, icons, symbols or a web page.

The display 160 may include a touch screen, which receives a touch, a gesture, proximity, or a hovering input, using an electronic pen or a user's body part (e.g., a finger).

The communication interface 170 may include various communication circuitry and establish communication between the electronic device 101 and a first external electronic device 102, a second external electronic device 104, and/or a server 106. For example, the communication interface 170 communicates with the first external electronic device 102, the second external electronic device 104, and/or the server 106 through the network 162 using wireless communication, wired communication, or via a short-range communication 164. For example, the wireless communication conforms to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM).

The wired communication may include at least one of a universal serial bus (USB), a high definition multimedia interface (HDMI), a recommended standard 232 (RS-232), and a plain old telephone service (POTS).

The network 162 may include a telecommunications network, a computer network such as local area network (LAN) or wide area network (WAN), the Internet, and a telephone network.

The electronic device 101 may provide an LTE service in a single radio environment by use of at least one module functionally or physically separated from the processor 120.

Each of the first and second external electronic devices 102 and 104 may be the same type or a different type from that of the electronic device 101.

The server 106 may include a group of one or more servers.

All or some of the operations to be executed by the electronic device 101 may be executed by the first external electronic device 102, the second external electronic device 104, and/or the server 106. For example, when the electronic device 101, automatically or by request, performs a certain function or service, the electronic device 101 may request some functions that are associated therewith from the first external electronic device 102, the second external electronic device 104, and/or the server 106, instead of or in addition to executing the function or service itself. The first external electronic device 102, the second external electronic device 104, and/or the server 106 may execute the requested functions or additional functions, and may transmit the results to the electronic device 101. The electronic device 101 may provide the requested functions or services by processing the received results. In doing so, a cloud computing technique, a distributed computing technique, or a client-server computing technique may be used.

According to an embodiment of the present disclosure, the processor 210 may determine a current mode of the electronic device based on a result detected in at least one of the above-described sensor modules. The processor 210 may generate a control signal based on the determined current mode, and adjust an operating frequency band of a conductive member of the electronic device in a low band by controlling a tunable circuit using the corresponding control signal.

Figure 2:
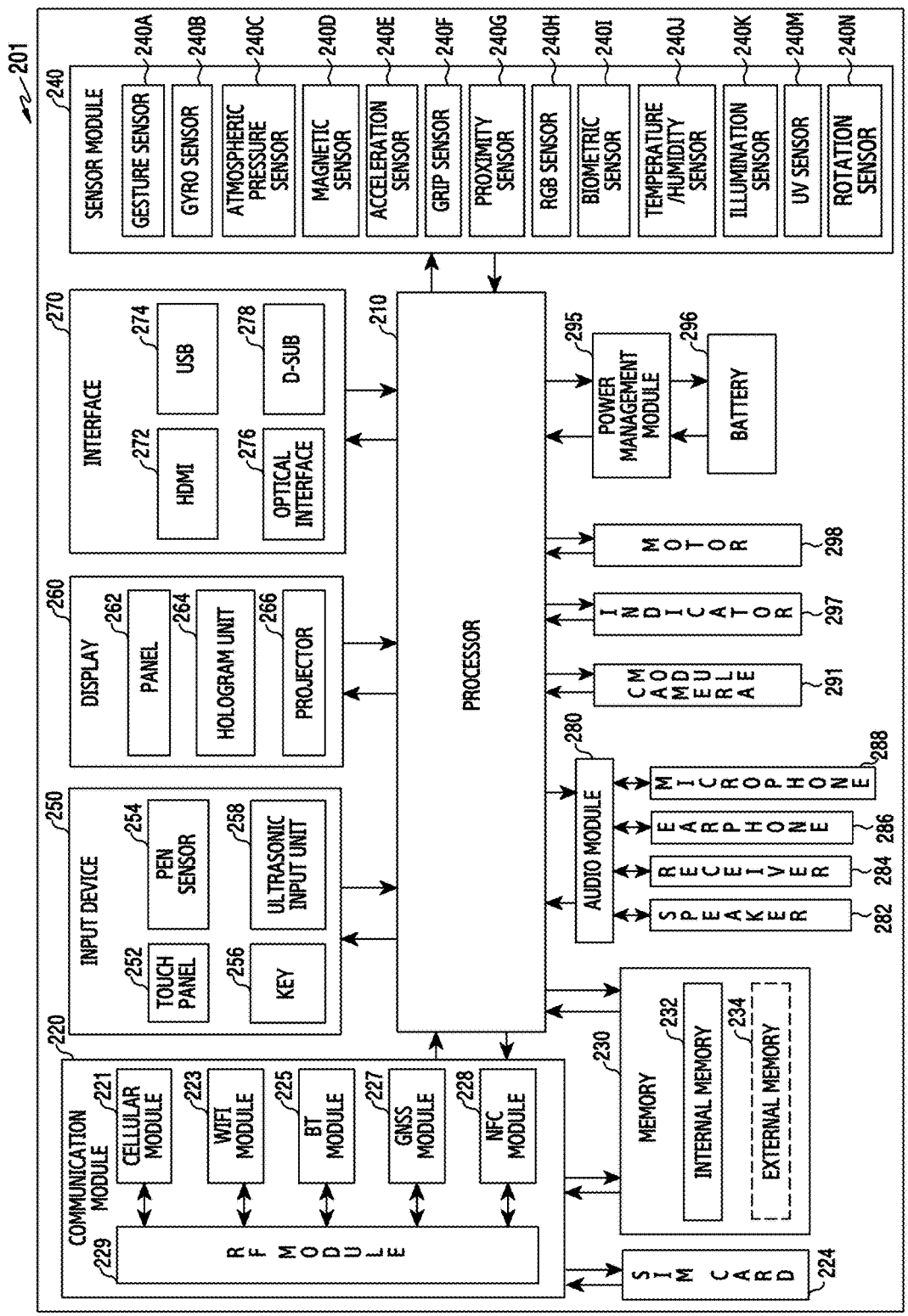
FIG. 2 is a block diagram of an electronic device, according to an embodiment of the present disclosure.

FIG. 2 is a block diagram of an electronic device, according to an embodiment of the present disclosure.

Referring to FIG. 2, the electronic device 201 includes a processor (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control a plurality of hardware or software elements connected to the processor 210 by driving an OS or an application program. The processor 210 may process multimedia data, may perform arithmetic operations, may be implemented with a system on chip (SoC), and may further include a GPU.

The communication module 220 may perform data transmission/reception between an external electronic device and/or a server, which may be connected with the electronic device through a network. The communication module 220 includes, at least one of a cellular module 221, a Wi-Fi module 223, a Bluetooth® (BT) module 225, a global navigation satellite system (GNSS) or GPS module 227, a near field communication (NFC) module 228, and a radio frequency (RF) module 229.

The cellular module 221 may provide a voice call, a video call, a text service, or an Internet service through a communication network, such as LTE, LTE-A, CDMA, WCDMA, UMTS, WiBro, or GSM. In addition, the cellular module 221 may identify and authenticate the electronic device within the communication network by using the SIM card 224. The cellular module 221 may perform at least some of the functions that can be provided by the processor 210, such as performing multimedia control functions.

The cellular module 221 may include a CP, and may be implemented, for example, with an SoC.

Although elements, such as the cellular module 221, the memory 230, and the power management module 295 are illustrated as separate elements with respect to the processor 210 in FIG. 2, the processor 210 may also be implemented such that at least one part of the aforementioned elements is included in the processor 210.

The processor 210 or cellular module 221 may load an instruction or data received from each non-volatile memory connected thereto or at least one of the different elements, to a volatile memory and process the instruction or data. In addition, the processor 210 or the cellular module 221 may store data into a non-volatile memory, which is received from or generated by at least one of the elements.

Each of the Wi-Fi module 223, the BT module 225, the GNSS module 227, and the NFC module 228 may include a processor for processing data. Although the cellular module 221, the Wi-Fi module 223, the BT module 225, the GNSS module 227, and the NFC module 228 are illustrated in FIG. 2 as separate blocks, at least two of the elements may be included in one integrated chip (IC) or IC package. For example, at least some of the processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 may transmit/receive data, such as an RF signal, and may include a transceiver, a power amp module (PAM), a frequency filter, or a low noise amplifier (LNA). In addition, the RF module 229 may further include a component for transmitting/receiving a radio wave on a free space in wireless communication, such as a conductor or a conducting wire. The cellular module 221, the Wi-Fi module 223, the BT module 225, the GNSS module 227, and the NFC module 228 may share the RF module 229, or at least one of these modules may transmit/receive an RF signal via a separate RF module.

The SIM card 224 may be inserted into a slot formed in the electronic device. The SIM card 224 includes unique identification information, such as an integrated circuit card identifier (ICCID) or subscriber information, such as an international mobile subscriber identity (IMSI).

The memory 230 includes an internal memory 232 and/or an external memory 234.

The internal memory 232 may include at least one of a volatile (i.e., a dynamic random access memory (DRAM), a static RAM (SRAM), or a synchronous dynamic RAM (SDRAM)), or a non-volatile memory (i.e., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and a solid state drive (SSD)).

The external memory 234 may include a flash drive, a compact flash (CF), a secure digital (SD), a micro-SD, a mini-SD, an extreme digital (xD), a memory stick, and may be operatively coupled to the electronic device via various interfaces.

The electronic device may also include a storage unit (or a storage medium), such as a hard drive.

The sensor module 240 may measure a physical quantity or detect an operation state of the electronic device, and convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, an illumination sensor 240K, and an ultraviolet (UV) sensor 240M.

Additionally or alternatively, the sensor module 240 may include an E-node sensor, an electromyography (EMG) sensor, an electroencephalogram (EEG) sensor, an electrocardiogram (ECG) sensor, and/or a fingerprint sensor.

The sensor module 240 may further include a control circuit for controlling at least one or more sensors included therein.

The input device 250 includes, at least one of a touch panel 252, a (digital) pen sensor 254, a key 256, and an ultrasonic input unit 258. The touch panel 252 may recognize a touch input by using at least one of an electrostatic type configuration, a pressure-sensitive type configuration, and an ultrasonic type configuration. The touch panel 252 may further include a control circuit. When the touch panel is of the electrostatic type, both physical contact recognition and proximity recognition are possible. The touch panel 252 may further include a tactile layer, which provides the user with a tactile reaction.

The (digital) pen sensor 254 may include a recognition sheet which can be a part of the touch panel or can be separately implemented from the touch panel. The (digital) pen sensor 254 may be implemented using the same or a similar method of receiving a touch input of a user or using an additional recognition sheet.

The key 256 may include a physical button, an optical key, or a keypad.

The ultrasonic input device 258 may detect ultrasonic waves generated by an input tool through a microphone 288, and may confirm data corresponding to the detected ultrasonic waves.

The ultrasonic input unit 258 may detect a reflected sound wave through the microphone 288 and perform radio recognition. An ultrasonic signal, which may be generated by using a pen, may be reflected off an object and detected by the microphone 288.

The electronic device may use the communication module 220 to receive a user input from an external device, such as a computer or a server connected thereto.

The display 260 includes a panel 262, a hologram device 264, and a projector 266.

The panel 262 may be an LCD or an AM-OLED and may be implemented in a flexible, transparent, or wearable manner. Alternatively, the panel 262 may be constructed as one module with the touch panel 252.

The hologram device 264 uses an interference of light and displays a stereoscopic image in the air.

The projector 266 displays an image by projecting a light beam onto a screen, which may be located inside or outside the electronic device.

The display 260 may further include a control circuit for controlling the panel 262, the hologram device 264, and/or the projector 266.

The interface 270 may include, at least one of, an HDMI 272, a USB 274, an optical communication interface 276, and a d-subminiature (D-sub) 278. Additionally or alternatively, the interface 270 may include a mobile high-definition link (MHL), SD/multi-media card (MMC), and/or infrared data association (IrDA).

The audio module 280 bilaterally converts a sound and an electric signal. The audio module 280 converts sound information input or output through a speaker 282, a receiver 284, an earphone 286, and/or the microphone 288.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 captures an image and/or a video, and may include one or more image sensors, such as a front sensor or a rear sensor, a lens, an image signal processor (ISP), or a flash, such as an LED or a xenon lamp. Alternatively, the electronic device may include two or more camera modules.

The power management module 295 manages power of the electronic device and may include a power management integrated circuit (PMIC), a charger IC, and/or a battery gauge.

The PMIC may be included in an IC or an SoC semiconductor and may use a wired charging and/or a wireless charging method. The charger IC may charge the battery 296 and may prevent an over-voltage or over-current flow.

Different types of wireless charging may include a magnetic resonance type, a magnetic induction type, and an electromagnetic type. An additional circuit for the wireless charging, such as a coil loop, a resonant circuit, and/or a rectifier may be added.

The battery gauge may measure a residual quantity, a voltage, a current, and a temperature during charging. The battery 296 stores or generates electricity and supplies power to the electronic device by using the stored or generated electricity. The battery 296 may include a rechargeable battery or a solar battery.

The indicator 297 indicates a specific state, such as a booting state, a message state, or a charging state of the electronic device or a part thereof (i.e., the processor 210).

The motor 298 converts an electrical signal into a mechanical vibration.

Alternatively, the electronic device includes a processing unit, such as a GPU, for supporting mobile TV, which processes media data according to a protocol, such as digital multimedia broadcasting (DMB), digital video broadcasting (DVB), and/or media flow.

An electronic device according to various embodiments of the present disclosure may be, for example, a wearable electronic device that can be worn on the user's body. However, the present disclosure is not limited thereto and embodiments of the present disclosure can be applied to various devices including a band that can be fastened to a housing, such as a main body.

Figure 3A:
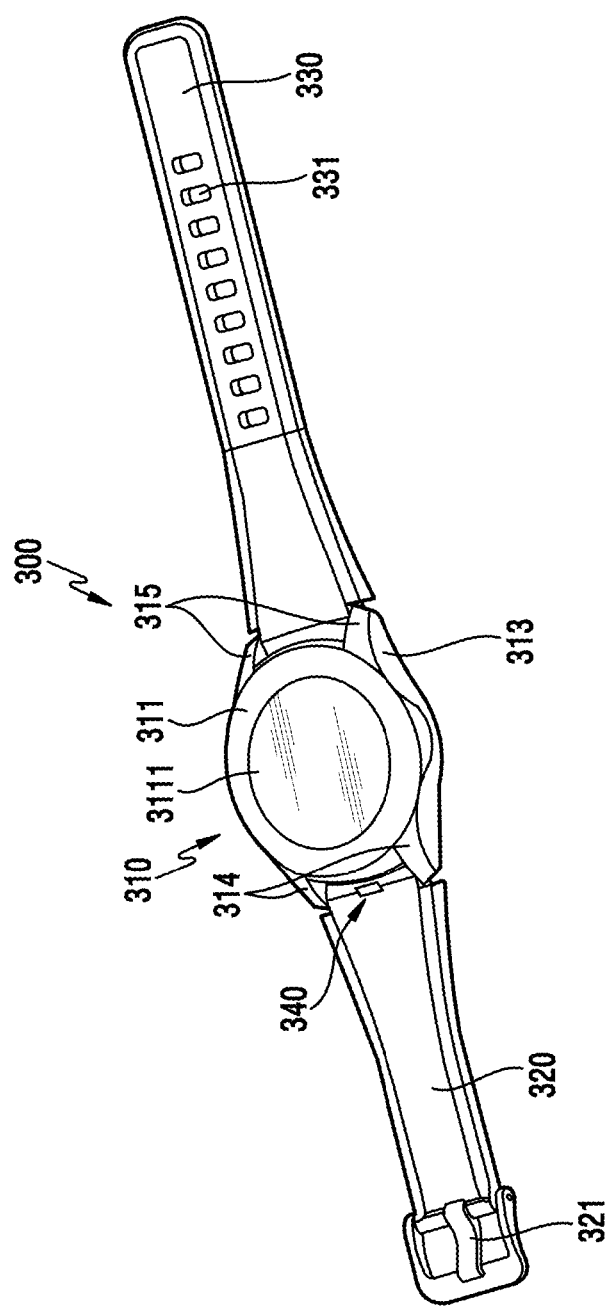
FIG. 3A is a perspective view of the front side of an electronic device, according to an embodiment of the present disclosure.
Figure 3B:
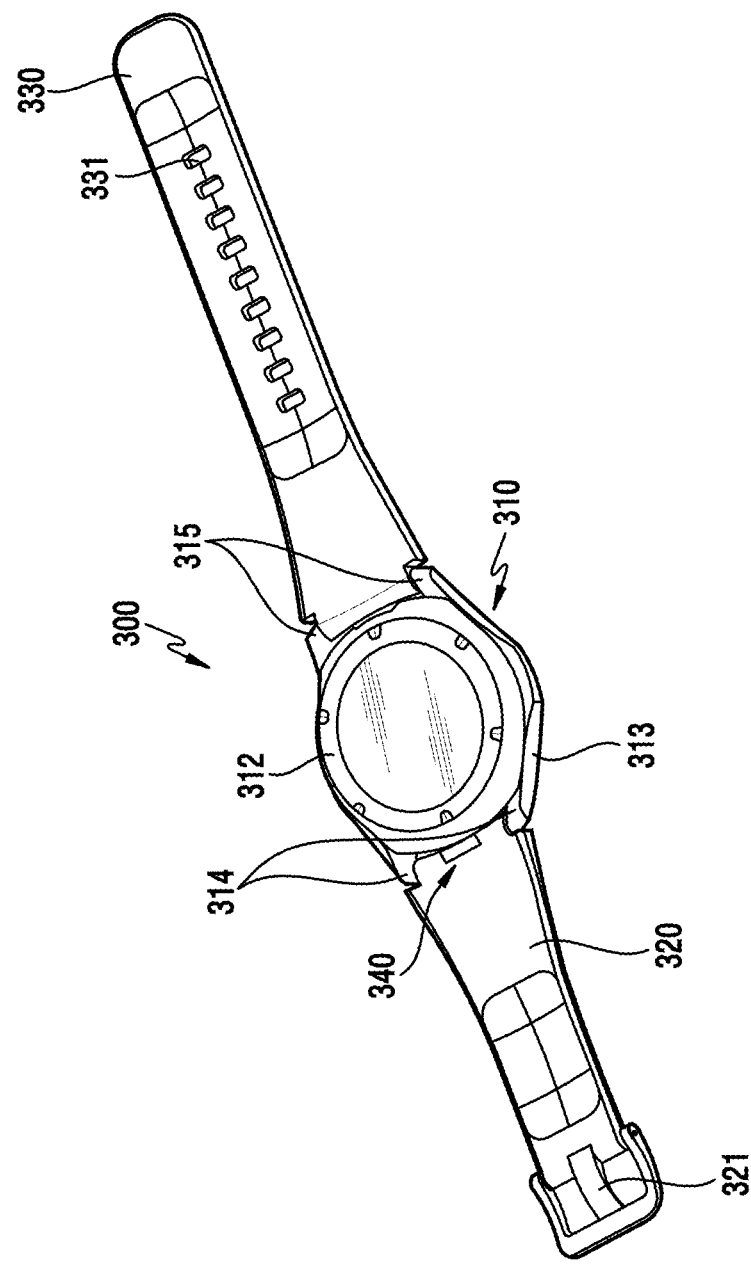
FIG. 3B is a view of the rear side of the electronic device of FIG. 3A, according to an embodiment of the present disclosure.

FIG. 3A is a perspective view of the front side of an electronic device, according to an embodiment of the present disclosure. FIG. 3B is a view of the rear side of the electronic device of FIG. 3A, according to an embodiment of the present disclosure.

An electronic device 300 of FIGS. 3A and 3B may be similar to an electronic device 101 of FIG. 1 or an electronic device 201 of FIG. 2, or it may be similar to other embodiments of the present disclosure.

Referring to FIGS. 3A and 3B, the electronic device 300 may include a wearable electronic device that can be worn on a part (i.e., a wrist or an ankle) of the user's body. The electronic device 300 may include a housing 310 that is used as a main body and at least one of bands 320 and 330, such as a strap, a coupler, a fastener, or a chain, that is mounted to at least a portion of the housing 310. The electronic device 300 can be worn by wrapping the bands 320 and 330 around a wrist with the housing 310 on the wrist.

The housing 310 includes a first plate 311 (i.e., a front side), a second plate 312 (i.e., a rear side) disposed opposite the first plate 311, and a side member 313 (i.e., a side) surrounding the space between the first plate 311 and the second plate 312. The first plate 311, the second plate 312, and the side member 313 may be integrally formed, and at least some of the first plate 311, the second plate 312, and the side member 313 may include a metallic member. At least some of the metallic members may be used as an antenna emitter of the electronic device 300. The side member 313 has a first fastening portion 314, disposed at a portion of the side member 313 to fasten a first band 320, and a second fastening portion 315, disposed at a portion opposite the first fastening portion 314 to fasten a second band 330.

The first band 320 has a buckle 321 and the second band 330 has a plurality of fastening holes 331 for fastening the buckle 321 of the first band 320. Accordingly, the electronic device 300 can be worn on a user's wrist by fastening the buckle 321 of the first band 320 to any one of the fastening holes 331 of the second band 330 with the housing 310 on the user's wrist. However, the present disclosure is not limited thereto and at least one band of a wearable electronic device may be an elastic band without a specific buckle. At least one band of a wearable electronic device may have a coupling structure using the magnetism of a magnet.

The housing 310 includes a display 3111 disposed so that it is exposed on the first plate 311. The display 3111 may operate as a touch screen device that includes a touch sensor, or the display 3111 may operate as a pressure reactive touch screen device that includes a pressure sensor. At least one key button may be disposed at a portion of the housing 310. The electronic device 300 may include a chargeable battery therein as a power supply and a coil member for wirelessly charging the battery. The electronic device 300 may include at least one antenna device for communication. The antenna device may include at least one conductive pattern (i.e., an antenna emission pattern) disposed in various ways in the electronic device 300. The electronic device 300 may be mounted on a predetermined portable charging cradle (i.e., a wireless charging cradle) to charge the battery. The electronic device 300 may include at least one processor electrically connected to the display 3111 in the housing 310, and at least one memory electrically connected to the processor in the housing 310.

The electronic device 300 may include a ring-shaped member rotatably disposed on the housing 310. The ring-shaped member may be installed to surround the entire display 3111 disposed on the housing 310. The ring-shaped member may be disposed in a rotatable bezel type when the electronic device is a wrist-wearable electronic device. The ring-shaped member can be rotated clockwise or counter-clockwise and may have a maximum rotational limit of 360 degrees or may be endlessly rotatable. The electronic device 300 can detect rotational parameters of the ring-shaped member and perform corresponding functions on the basis of the detected parameters.

The housing 310 may include at least one sensor device (i.e., a sensor module 240) disposed in at least a portion of the housing 310. The sensor device may include at least one of a camera sensor, a fingerprint sensor, an infrared sensor, a heart rate monitor (HRM) sensor, a photo sensor, a proximity sensor, a light sensor, a temperature sensor, and an iris sensor.

The electronic device 300 includes a mounting structure 340 for detachably mounting the first band 320 to the housing 310. The mounting structure 340 may include a rotating member (i.e., 441 in FIG. 4) exposed to the outside of the electronic device 300. A user can easily mount the first band 320 to the housing 310 or detach the first band 320 from the housing 310 by rotating the rotating member (i.e., 441 in FIG. 4).

Figure 4:
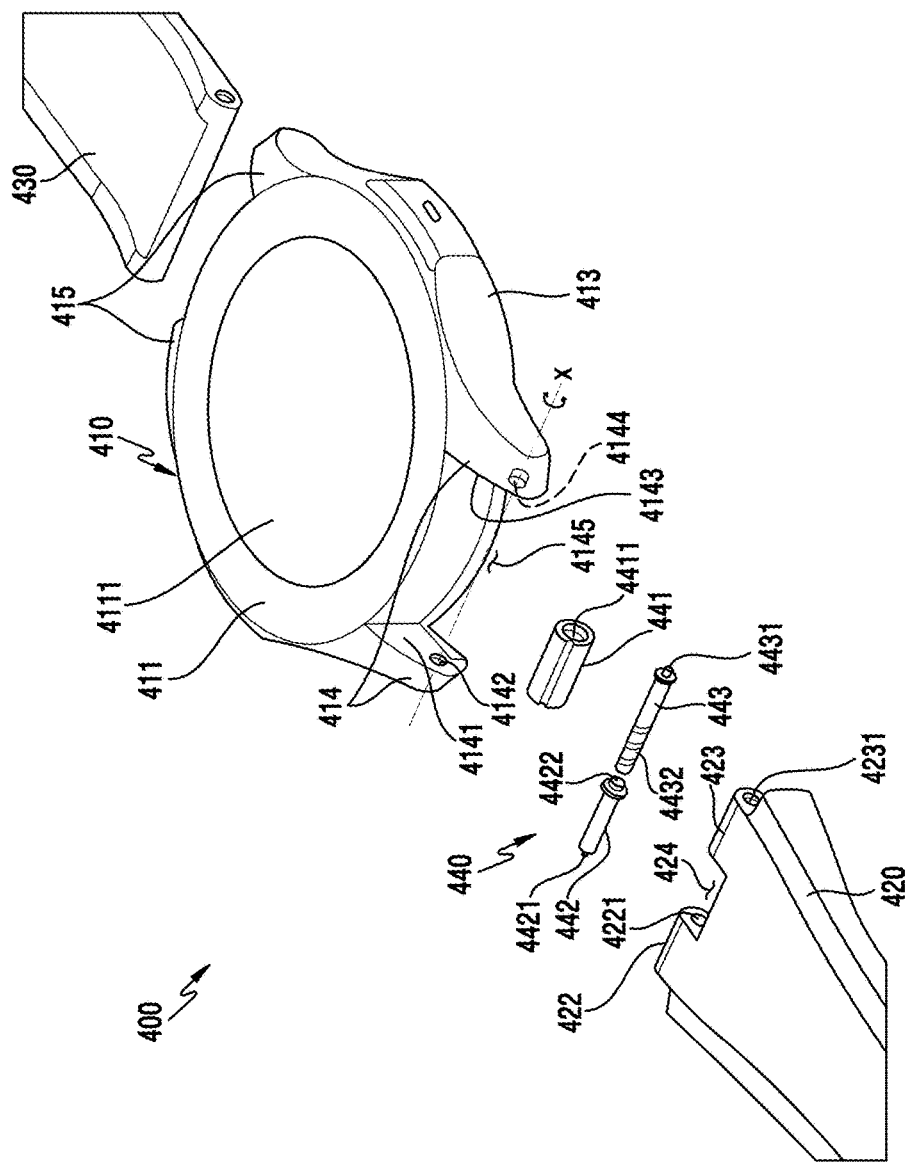
FIG. 4 is an exploded perspective view of an electronic device, according to an embodiment of the present disclosure.

The electronic device 300 may include a sensing member (i.e., a hall sensor) for detecting a sensed member (i.e., a magnet) disposed on the rotating member (i.e., 441 in FIG. 4). The electronic device 300 can detect rotational parameters according to rotation of the rotating member (i.e., 441 in FIG. 4) through the sensing member and can output information based on the detected information. For example, the output information may include a sound effect or an image that is output through the display to allow for recognizing rotation of the rotating member (i.e., 441 in FIG. 4). The electronic device 300 (i.e., a processor 120 or a processor 210) may be used to display corresponding information on the display 3111 or control applications (i.e., operate a UI) that are executed by the electronic device 300 in accordance with the detected information.

The electronic device 300 includes one mounting structure 340 for mounting the first band 320, but is not limited thereto. For example, such a mounting structure may be additionally used to mount the second band 330 to the housing 310.

FIG. 4 is an exploded perspective view of an electronic device, according to an embodiment of the present disclosure.

An electronic device 400 and a mounting structure 440 of FIG. 4 may be similar to the electronic device 300 and the mounting structure 340 or may include other embodiments of an electronic device and a mounting structure.

Referring to FIG. 4, the electronic device 400 includes a housing 410 that is used as a main body and at least one of band 420 and band 430, mounted to at least a portion of the housing 410. The electronic device 400 can be worn by wrapping at least one of band 420 and band 430 around a wrist with the housing 410 on the wrist.

The housing 410 may include a first plate 411 (i.e., a front side), a second plate (i.e., a rear side) disposed opposite the first plate 411, and a side member 413 (i.e., a side) surrounding the space between the first plate 411 and the second plate. The first plate 411, the second plate, and the side member 413 may be integrally formed. The side member 413 may have a first fastening portion 414 disposed at a portion of the side member 413 to fasten a first band 420. The side member 413 may have a second fastening portion 415 at a portion opposite the first fastening portion 414 to fasten a second band 430. The electronic device 400 may include at least one processor electrically connected to the display 4111 in the housing 410. The electronic device 400 may include at least one memory electrically connected to the processor in the housing 410.

The electronic device 400 includes a mounting structure 440 for detachably mounting the first band 420 to the housing 410. The mounting structure 440 may be fixed to the first band 420 or may be received in a band receiving space 4145 formed at the first fastening portion 414. The first fastening portion 414 may have a first surface 4141, a second surface 4143 facing the first surface 4141, a first hole 4142 formed in the first surface 4141, and a second hole 4144 formed in the second surface 4143 and facing the first hole 4142. The first fastening portion 414 may be included in a recessed structure 4145 (i.e., a band receiving space) for the first band 420, in which an imaginary line extending from the first hole 4142 to the second hole 4144 defines an X-axis.

The mounting structure 440 includes a rotating member 441 positioned to rotate about the X-axis and having an inner screw surface 4411 in a through-hole thereof. The mounting structure 440 may be positioned to be seated in a recess 424 between a first portion 422 and a second portion 423. When the mounting structure 440 is fixed to the first band 420 and the first band 420 is fastened to the first fastening portion 414 of the housing 410, the rotating member 441 may be positioned to be exposed to the outside of the electronic device 400 so that a user can operate the rotating member 441.

The mounting structure 440 includes a first rod 442 positioned to at least partially pass through the through-hole in the rotating member 441. The first rod 442 extends along the X-axis through the first portion 422 of the first band 420 and may have a first end 4421 inserted into the first hole 4142 formed in the first surface 4141 of the first fastening portion 414 and a second end 4422 supported by the rotating member 441. The first rod 442 may be positioned so as to be prevented from moving along the X-axis while the rotating member 441 is rotated.

The mounting structure 440 includes a second rod 443 extending along the X-axis through the second portion 423 of the first band 420. According to an embodiment, the second rod 443 may have a third end 4431 rotatably inserted into the second hole 4144 formed in the second surface 4413 of the first fastening portion 414 and an external screw surface 4432 engaged with the inner screw surface 4411 of the rotating member 441. The second rod 443 can move along the X-axis while the rotating member 441 is rotated.

The first rod 442 and the second rod 443 may be positioned at least partially through the rotating member 441. The first band 420 may be fixed to the housing 410 by inserting the first end 4421 of the first rod 442 and the third end 4431 of the second rod 443 into the first hole 4142 and the second hole 4144 formed in the first fastening portion 414 of the housing 410 through a first through-hole 4221 formed in the first portion 422 of the first band 420 and a second through-hole 4231 formed in the second portion 423.

The rotating member 441, the first rod 442, and the second rod 443 may be made of metal and/or synthetic resin. When rotating in the recess 424 of the first band 420, the rotating member 441 moves the second rod 443 engaged with the rotating member 441 in the X-axial direction such that the third end 4431 of the second rod 443 is inserted into or removed from the second hole 4144 of the first fastening portion 414. Accordingly, the first band 420 can be mounted to or detached from the housing 410.

Figure 5A:
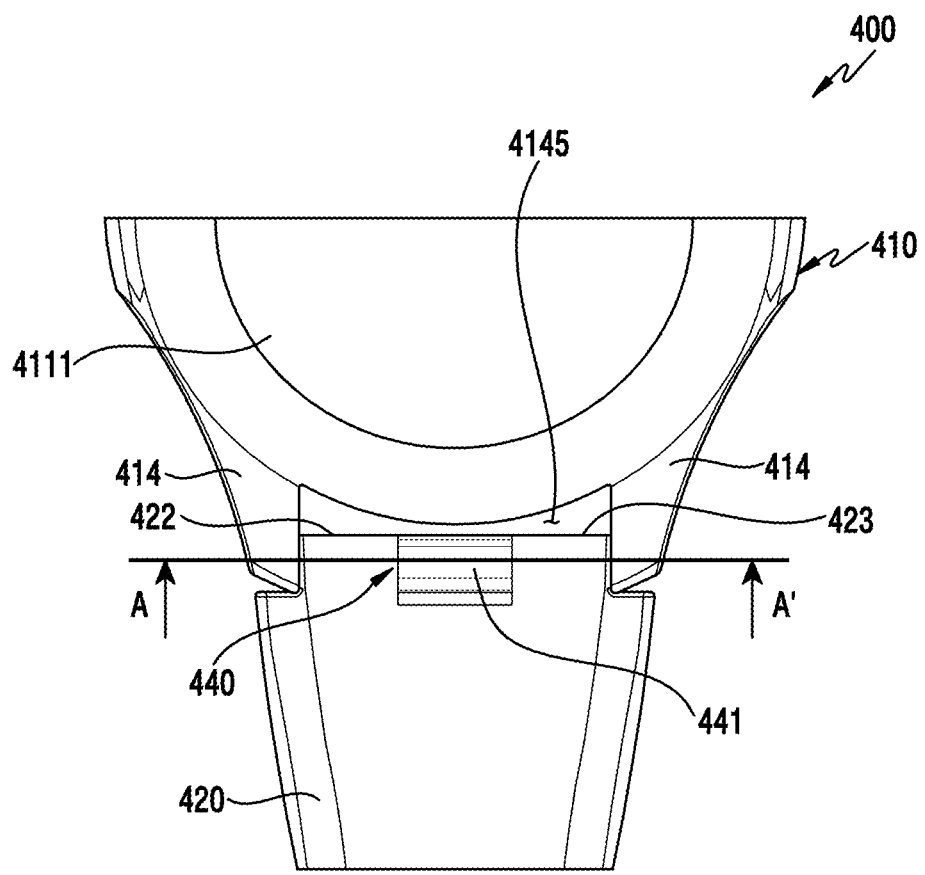
FIG. 5A is a view of the main configuration of the electronic device with the band coupled to the housing, according to an embodiment of the present disclosure.

FIG. 5A is a view showing the main configuration of the electronic device with the band coupled to the housing, according to an embodiment of the present disclosure.

FIG. 5A illustrates the state in which the first band 420 has been fixed to the housing 410 by the mounting structure 440 of FIG. 4. The first band 420 can be completely coupled by inserting the first portion 422, the second portion 423, and the mounting structure 440, positioned between the first and second portions, into the band receiving space 4145 in the housing 410. In this case, the rotating member 441 of the mounting structure 440 may be exposed to the outside of the electronic device 400, and a user can mount or detach the first band 420 to or from the housing 410 by rotating the rotating member 441.

Figure 5B:
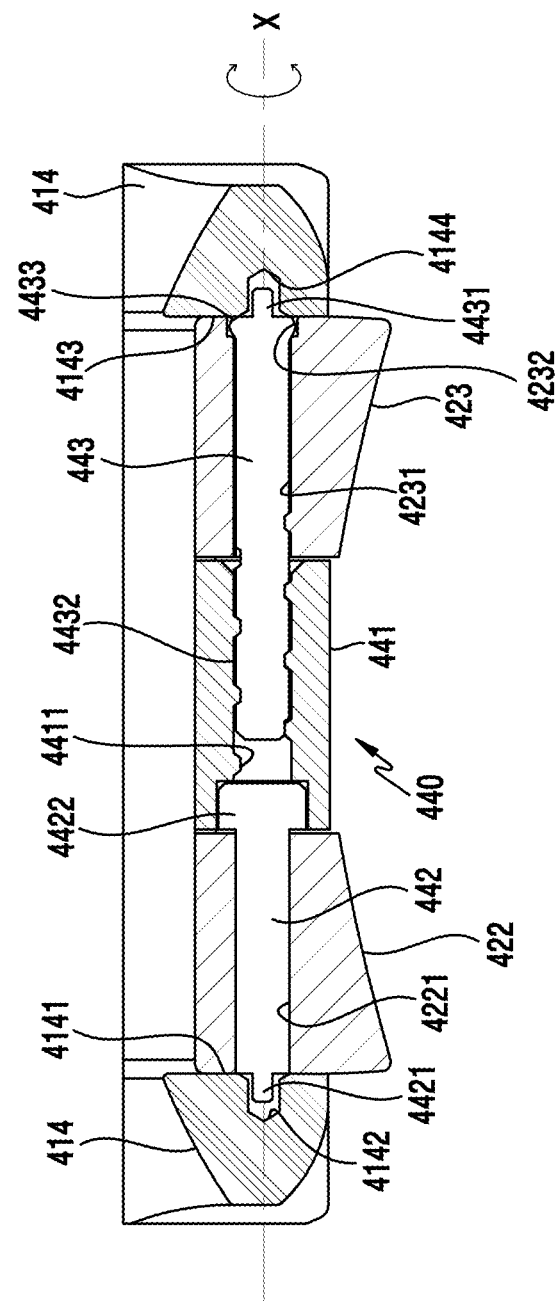
FIG. 5B is a cross-sectional view of the electronic device taken along line A-A' in FIG. 5A, according to an embodiment of the present disclosure.

FIG. 5B is a cross-sectional view of the electronic device taken along line A-A' in FIG. 5A, according to an embodiment of the present disclosure.

Referring to FIG. 5B, the first rod 442 of the mounting structure 440 may be positioned through the first portion 422 of the first band 420. The first rod 442 may be positioned with the first end 4421 inserted into the first hole 4142 formed in the first surface 4141 of the first fastening portion 414 of the housing 410 and the second end 4422 inserted into an end of the rotating member 441. The second rod 443 may be positioned with the third end 4431 inserted into the second hole 4144 formed in the second surface 4143 of the first fastening portion 414 of the housing 410 and the external screw surface 4432 engaged with the inner screw surface 4411 through the rotating member 441. The rotating member 441, the first rod 442, and the second rod 443 may be positioned along the imaginary X-axis extending through the first hole 4142 and the second hole 4144 in the first fastening portion 414.

When the rotating member 441 is rotated in a direction (i.e., clockwise or counterclockwise) about the X-axis, the second rod 443 engaged with the rotating member 441 can move straight along the X-axis. For example, when the rotating member 441 is rotated clockwise, the second rod 443 moves straight toward the second hole 4144 along the X-axis and the third end 4431 is inserted into the second hole 4144, so the first band 420 can be fixed to the first fastening portion 414 of the housing 410. In this case, the first end 4421 of the first rod 442 can remain inserted into the first hole 4142 in the first fastening portion 414.

Figure 5C:
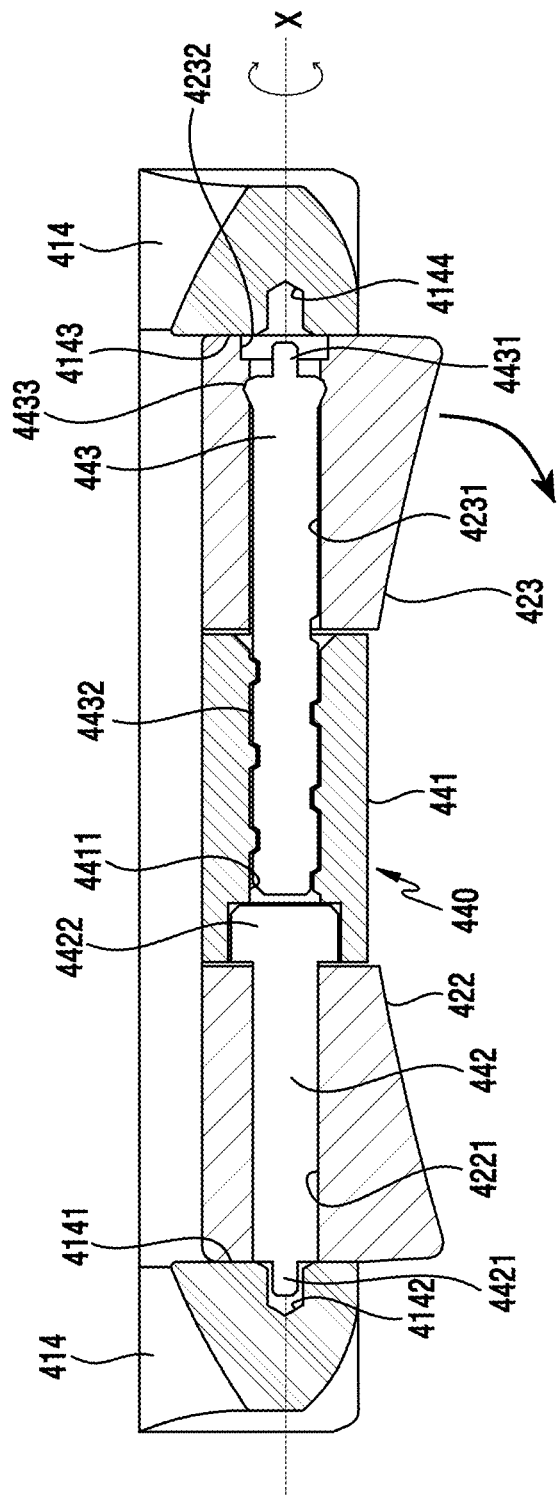
FIG. 5C is a cross-sectional view of the electronic device when the band is detached from the housing, according to an embodiment of the present disclosure.

FIG. 5C is a cross-sectional view of the electronic device when the band is detached from the housing, according to an embodiment of the present disclosure.

Referring to FIG. 5C, when the rotating member 441 is rotated in a direction (for example, counterclockwise or clockwise) about the X-axis, the second rod 443 engaged with the rotating member 441 can move straight along the X-axis. For example, when the rotating member 441 is rotated counterclockwise, the second rod 443 moves straight toward the first hole 4142 along the X-axis and the third end 4431 is removed from the second hole 4144, so the first band 420 can be detached in the direction of the arrow.

A user can easily mount or detach the first band 420 to or from the housing 410 merely by rotating the rotating member 441 exposed on the first band 420.

The first portion 422 and the second portion 423 of the first band may be made of an elastic material (i.e., rubber, urethane, or silicon). At least a portion of the end opposite the external screw surface 4432 of the second rod 443 has a projection 4433 protruding along the outer circumferential surface, and the projection 4433 is tightly coupled to the second through-hole 4231 in the second portion 423, so the rotating member 441 can be guided to prevent unexpected rotation and allow only rotation intended by the user. The projection 4433 may be configured to be locked (i.e., seated) to a locking step 4232 formed at the front end of the second through-hole 4231 of the second portion 423 when the third end 4431 of the second rod 443 is fitted into the second hole 4144 formed in the second surface 4143 of the first fastening portion 414 so that the rotating member 441 is not rotated unless the rotating member 441 is rotated by a pressing force of a predetermined level or more. The projection 4433 may be formed to include an elastic member (i.e., an O-ring or double-injected urethane), in which case the second portion 423 need not be made of an elastic material.

Figure 6A:
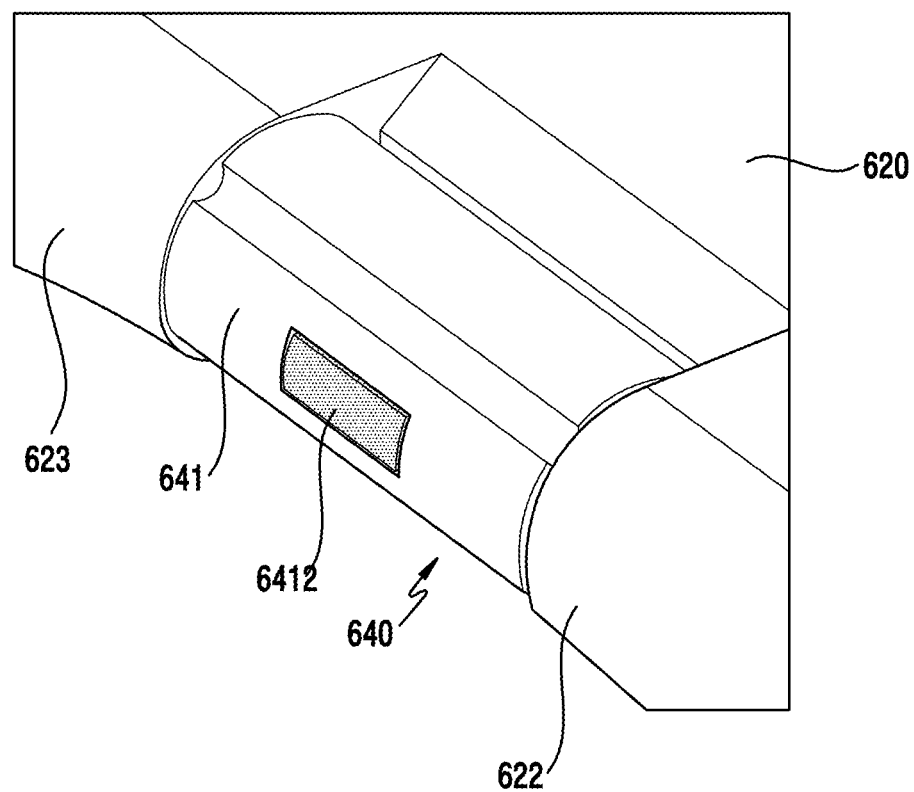
FIG. 6A is a view of a band having a mounting structure including a sensed member, according to an embodiment of the present disclosure.
Figure 6B:
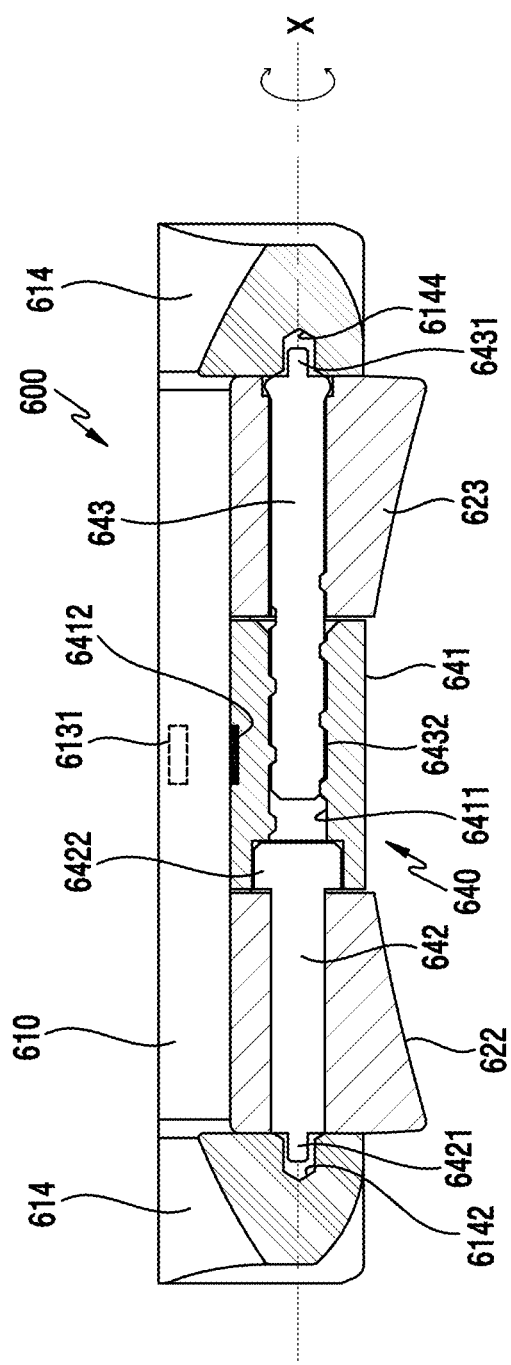
FIG. 6B is a cross-sectional view of the electronic device having a detection structure for detecting the mounting structure, according to an embodiment of the present disclosure.

FIG. 6A is a view of a band having a mounting structure including a sensed member, according to an embodiment of the present disclosure. FIG. 6B is a cross-sectional view of an electronic device having a detection structure for detecting the mounting structure, according to an embodiment of the present disclosure.

A mounting structure 640 of FIGS. 6A and 6B may be similar to the mounting structure 440 of FIG. 4, or may include features of a mounting structure found in other embodiments of the present disclosure.

Referring to FIG. 6A, the mounting structure 640 is positioned between a first portion 622 and a second portion 623 of a first band 620. The mounting structure 640 includes a rotating member 641 exposed to the outside of the first band 620. The rotating member 641 may be rotatably positioned on the first band 620 and includes at least one magnet 6412 positioned to face a housing of the electronic device. The magnet 6412 may be positioned to be exposed on the outer side of the rotating member 641, or the magnet 6412 may be positioned to be inserted in the rotating member 641. When the rotating member 641 is made of synthetic resin, the magnet 6412 may be positioned in the rotating member 641 by insert molding.

Referring to FIG. 6B, a first rod 642 of the mounting structure 640 is positioned through the first portion 622 of the first band 620. The first rod 642 may be positioned with a first end 6421 inserted into a first hole 6142 formed in a first fastening portion 614 of the housing 610 and a second end 6422 inserted into an end of the rotating member 641. The second rod 643 is positioned with a third end 6431 inserted into a second hole 6144 formed in the first fastening portion 614 of the housing 610 and an external screw surface 6432 engaged with an inner screw surface 6411 through the rotating member 641. The rotating member 641, the first rod 642, and the second rod 643 are positioned along the imaginary X-axis extending through the first hole 6142 and the second hole 6144 in the first fastening portion 614. Therefore, as described above, the rotating member 641 can be rotated about the X-axis and can move the second rod 643 toward the second hole 6144 or the first hole 6142 along the X-axis, depending of the rotational direction.

According to an embodiment of the present disclosure, as described above, the rotating member 641 includes at least one magnet 6412. At least one hall sensor 6131 may be positioned on the housing 610 where the hall sensor can detect the magnetism of the magnet 6412. The electronic device 600 (i.e., a processor of the electronic device) can obtain rotational parameters by detecting the magnetism of the magnet 6412 through the hall sensor 6131 in accordance with a rotation of the rotating member 641. The electronic device 600 can control the function of the electronic device 600 using the obtained rotational parameters. The electronic device 600 can detect the rotational parameters of the rotating member 641 and audibly output a sound effect through a speaker, visually output an image through a display, or tactually output vibration through a vibration motor, in accordance with the detected information, to enable recognition of a rotation of the rotating member 641. The electronic device 600 may be used to display corresponding information on the display or control applications (i.e., operate a UI) that are executed by the electronic device 600, in accordance with the detected information.

Figure 7:
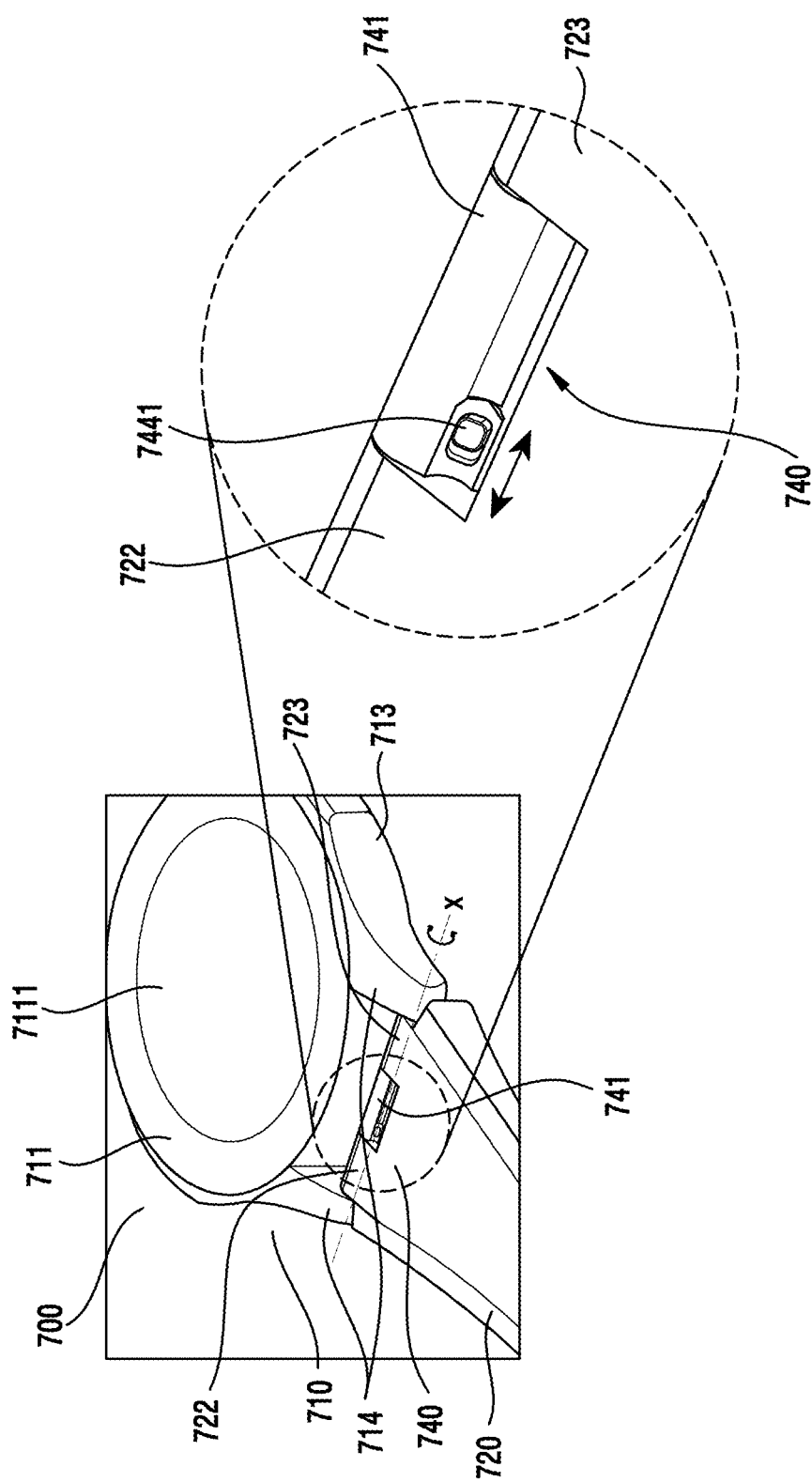
FIG. 7 is a perspective view of the electronic device including a mounting structure, according to an embodiment of the present disclosure.

FIG. 7 is a perspective view of an electronic device including a mounting structure, according to an embodiment of the present disclosure.

An electronic device 700 of FIG. 7 may be similar to the electronic device 300 of FIG. 3, or may include other aspects of an electronic device found in the present disclosure.

Referring to FIG. 7, the electronic device 700 includes a wearable electronic device that can be worn on a part (i.e., a wrist or an ankle) of the user's body. The electronic device 700 includes a housing 710 that is used as a main body and at least one band 720 (i.e., a strap, a coupler, a fastener, or a chain) that is mounted to at least a portion of the housing 710. The electronic device 700 can be worn by wrapping the band 720 around a wrist with the housing 710 on the wrist.

According to an embodiment of the present disclosure, the housing 710 includes a first plate 711 (i.e., a front side), a second plate disposed opposite the first plate 711, and a side member 713 (i.e., a side) surrounding the space between the first plate 711 and the second plate. The first plate 711, the second plate, and the side member 713 may be integrally formed. The side member 713 has a first fastening portion 714 positioned to fasten a first band 720. The first plate 711 includes a display 7111 exposed outside the electronic device 700. The electronic device 700 may include at least one processor (i.e., a processor 120 or a processor 210) electrically connected to the display 7111 in the housing 710, and at least one memory (i.e., a memory 130 or a memory 230) electrically connected to the processor in the housing 710.

According to an embodiment of the present disclosure, the first band includes a mounting structure 740 positioned between a first portion 722 and a second portion 723. The mounting structure 740 includes a rotating member 741. The rotating member 741 includes a lever 7441 exposed to the outside and movable to the left and right (in the direction of the double-sided arrow in FIG. 7).

The mounting structure 740 can perform different functions, depending on the left and right positions of the lever 7441. When the lever 7441 is moved to one side, the mounting structure 740 may perform a first function that mounts or detaches the first band 720 to or from the housing 710. When the lever 7441 is moved to the other side, the mounting structure 740 may perform a second function that provides rotational parameters by a rotation of the rotating lever 741 to the electronic device 700 and performs a function corresponding to the provided rotational parameters. The first function and the second function may be performed independently or simultaneously.

Figure 8A:
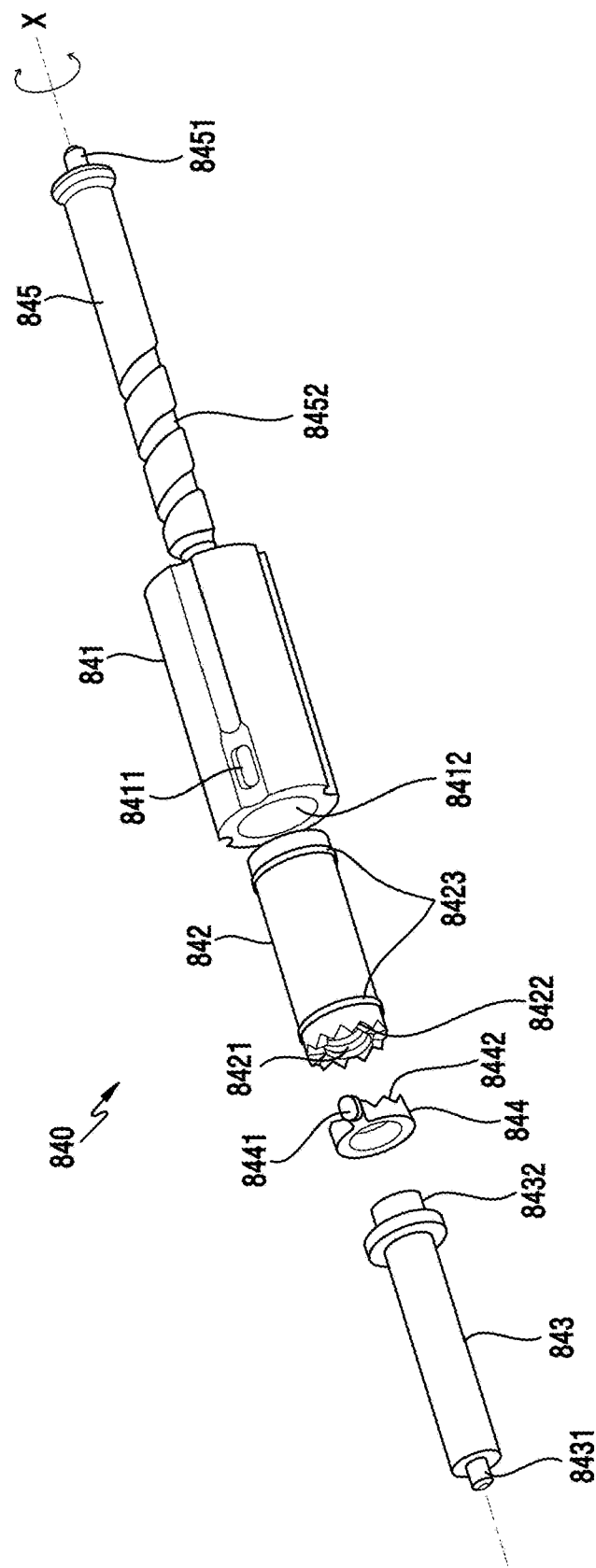
FIG. 8A is an exploded perspective view of the mounting structure, according to an embodiment of the present disclosure.

FIG. 8A is an exploded perspective view of the mounting structure, according to an embodiment of the present disclosure.

A mounting structure 840 of FIG. 8A may be similar to the mounting structure 340 of FIG. 3, or may include other aspects of a mounting structure found in the present disclosure.

Referring to FIG. 8A, the mounting structure 840 includes a rotating member 841 having a through-hole 8412, an inner housing 842 positioned to be selectively rotatable in the through-hole 8412 in the rotating member 841, a first rod 843 supporting an end of the inner housing 842 and fixed to a fastening portion of a housing (i.e., the housing 310) of an electronic device (i.e., the electronic device 300), a second rod 845 partially inserted in the inner housing 842 and fastened to the fastening portion of the housing, and a clutch 844 interposed between the first rod 843 and the inner housing 842 and selectively allowing and stopping a rotation of the inner housing 842 by moving along an X-axis.

The rotating member 841 may be positioned to be rotatable about the X-axis and may have the through-hole 8412 therein. The inner housing 842 and the clutch 844 may be received in the through-hole 8412, and the first rod 843 and the second rod 845 may be partially received therein. The rotating member 841 may have a lever through-hole 8411 for receiving a lever extending from the clutch mounted therein.

According to an embodiment of the present disclosure, the inner housing 842 is disposed to be selectively rotatable about the X-axis in the through-hole 8412 in the rotating member 841 and may have an inner screw surface 8421 formed inside the through-hole. The inner housing 842 may have saw teeth 8422 formed at an end toward the first rod 843, and may have projections 8423 protruding from around the outer circumferential surface of the inner housing 842. The projections 8423 can provide predetermined pressure in the space between the inner housing 842 and the rotating member 841 when the inner housing 842 is mounted in the through-hole 8412 in the rotating member 841. The projections 8423 are tightly fitted to the inner side of the rotating member 841, so the projections 8423 can allow the rotating member 841 to perform only an intended rotation, without freely rotating. However, the present disclosure is not limited thereto, and elastic projections may be formed around the inner side of the rotating member, and in this case, there is no need to form the projections 8423 on the inner housing 842.

The projections 8423 may provide a user with an appropriate feeling of a rotation when the inner housing 842 and the rotating member 841 are rotated together. The projections 8423 may be integrally formed with the inner housing 842 or may be positioned separately. The projections 8423 may be made of an elastic material having high friction such as rubber, silicon, or urethane.

The first rod 843 extends along the X-axis and may have a first end 8431 inserted in a first fastening portion (i.e., the first fastening portion 714) of the housing and a second end 8432 supporting the clutch 844. The first rod 843 may be positioned not to move along the X-axis while the rotating member 841 and the inner housing 842 are rotated.

The second rod 845 may be positioned along the X-axis and may have a third end 8451 inserted into the first fastening portion of the housing and an external screw surface 8452 engaged with the inner screw surface 8421 of the inner housing 842. The second rod 845 can move along the X-axis while the inner housing 842 is rotated.

The clutch 844 may be interposed between the first rod 843 and the inner housing 842, and may be positioned in parallel with the inner housing 842 in the through-hole 8412 of the rotating member 841. The clutch 844 may have saw teeth 8442 formed toward the inner housing 842, and can be moved along the X-axis, so the saw teeth 8442 of the clutch 844 can be engaged with the saw teeth 8422 of the inner housing 842. However, the present disclosure is not limited thereto, and any structure that can rotate the clutch 844 and the inner housing 842 together when they are combined, other than the engaging structure, may be applied.

The clutch 844 may have a lever 8441 that is exposed through the lever through-hole 8411 in the rotating member 841 when the clutch 844 is mounted in the rotating member 841. The lever 8441 is exposed to the outside by a predetermined amount through the lever through-hole 8411 in the rotating member 841, so the lever 8441 can be operated by a user. When the lever 8441 is operated, the clutch 844 can be engaged with or disengaged from the inner housing 842. When the lever 8441 is operated and the clutch 844 and the inner housing 842 are engaged with each other, the inner housing 842 can also be rotated by a rotation of the rotating member 841. When the lever 8441 is operated and the clutch 844 and the inner housing 842 are disengaged from each other, the rotating member 841 can be rotated independently from the inner housing 842.

Figure 8B:
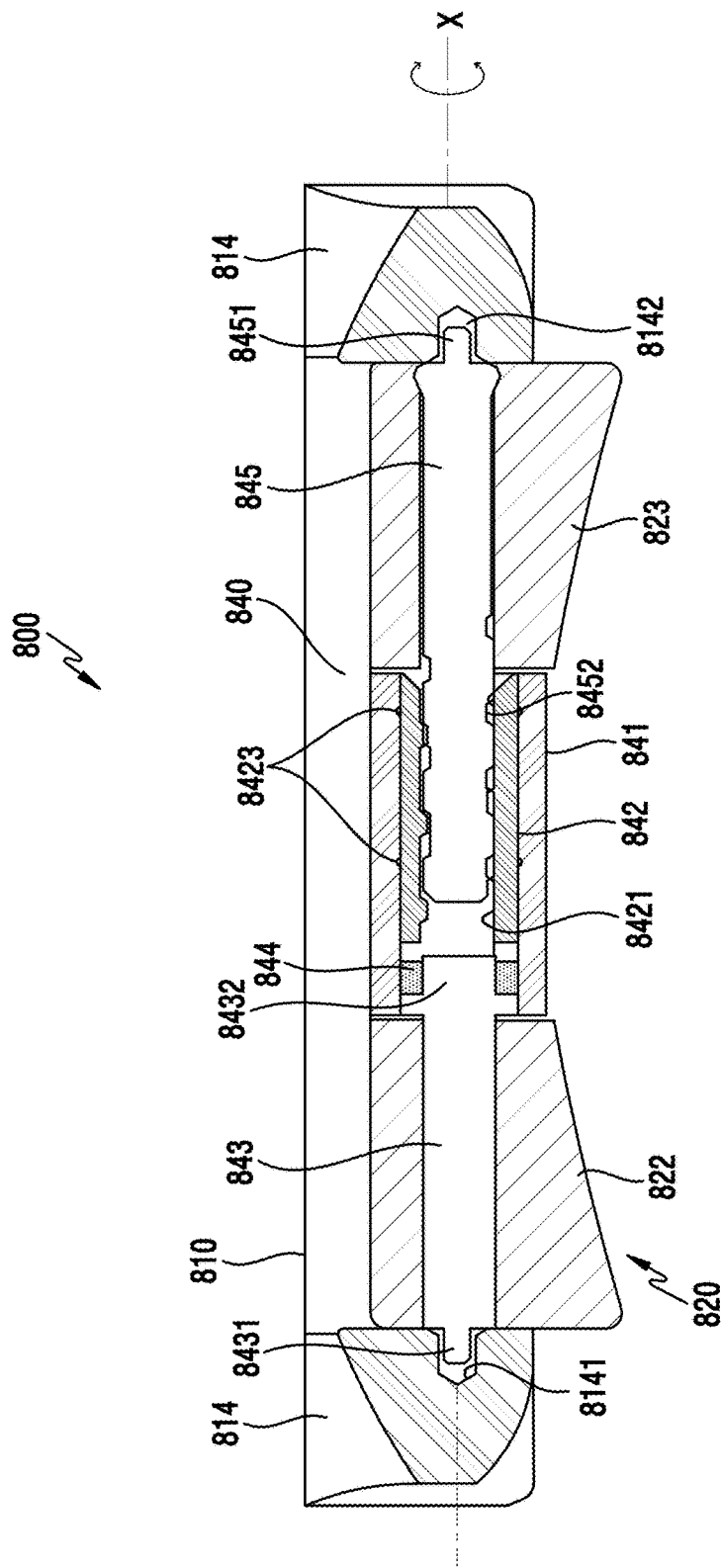
FIG. 8B is a cross-sectional view of the electronic device with the band fastened by the mounting structure, according to an embodiment of the present disclosure.

FIG. 8B is a cross-sectional view of the electronic device 800 with the band fastened by the mounting structure, according to an embodiment of the present disclosure. FIG. 8B illustrates the state in which a first band 820 has been fixed to a housing 810 by the mounting structure 840 of FIG. 8A.

Referring to FIG. 8B, the first rod 843 of the mounting structure 840 is positioned through a first portion 822 of the first band 820. The first rod 843 may be positioned with the first end 8431 inserted into a first hole 8141 formed in a first fastening portion 814 of the housing 810 and the second end 8432 inserted into an end of the rotating member 841. The second rod 845 may be positioned with the third end 8451 inserted into a second hole 8142 formed in the first fastening portion 814 of the housing 810 and the external screw surface 8452 engaged with the inner screw surface 8421 through the inner housing 842. The clutch 844 may be positioned between the first rod 843 and the inner housing 842 so as to move left and right along the X-axis. At least portions of the first rod 843 and the second rod 845, the inner housing 842, and the clutch 844 may be positioned on substantially the same line on the X-axis in the rotating member 841.

Figure 9A:
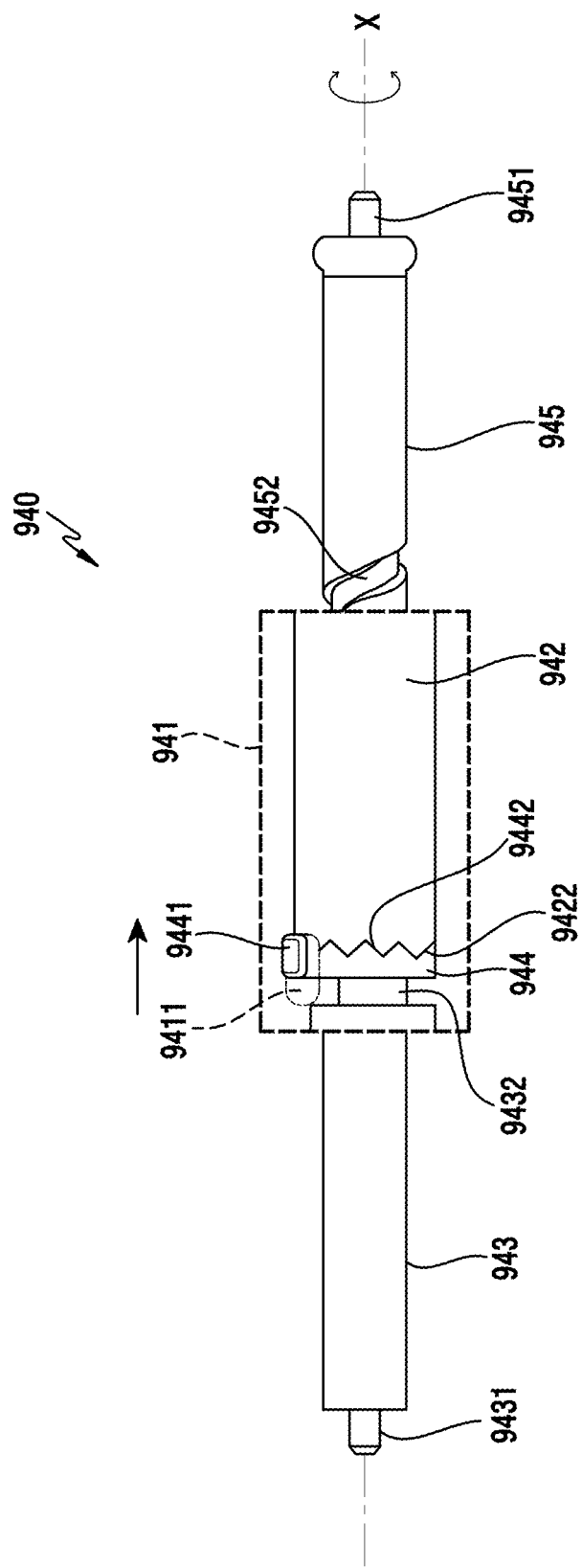
FIG. 9A is a view of the state in which a band is mounted and detached by a mounting structure through a clutch, according to an embodiment of the present disclosure.

FIG. 9A is a view of the state in which a band is mounted and detached by a mounting structure through a clutch, according to an embodiment of the present disclosure.

A mounting structure 940 of FIG. 9A may be similar to the mounting structure 840 of FIGS. 8A and 8B or may include other aspects of a mounting structure found in the present disclosure.

Referring to FIG. 9A, when a lever 9441 of a clutch 944 exposed through a lever through-hole 9411 of a rotating member 941 is moved in the direction of an arrow with the mounting structure 940 assembled, saw teeth 9442 of the clutch 944 and saw teeth 9422 of an inner housing 942 can be maintained in an engaged state. In this case, when the rotating member 941 is rotated, the lever 9441 exposed through the rotating member 941 is rotated therewith, so the clutch 944 and the inner housing 942 can also be rotated together. According to an embodiment, when the rotating member 941 is rotated, the first end 9431 of the first rod 943 can remain fixed to the housing, but the third end 9451 of the second rod 945 can be moved along the X-axis. Accordingly, the second rod 945 is mounted to or detached from the housing, depending on the rotational direction of the rotating member 941, so the second rod 945 can participate in mounting and detaching a band.

Figure 9B:
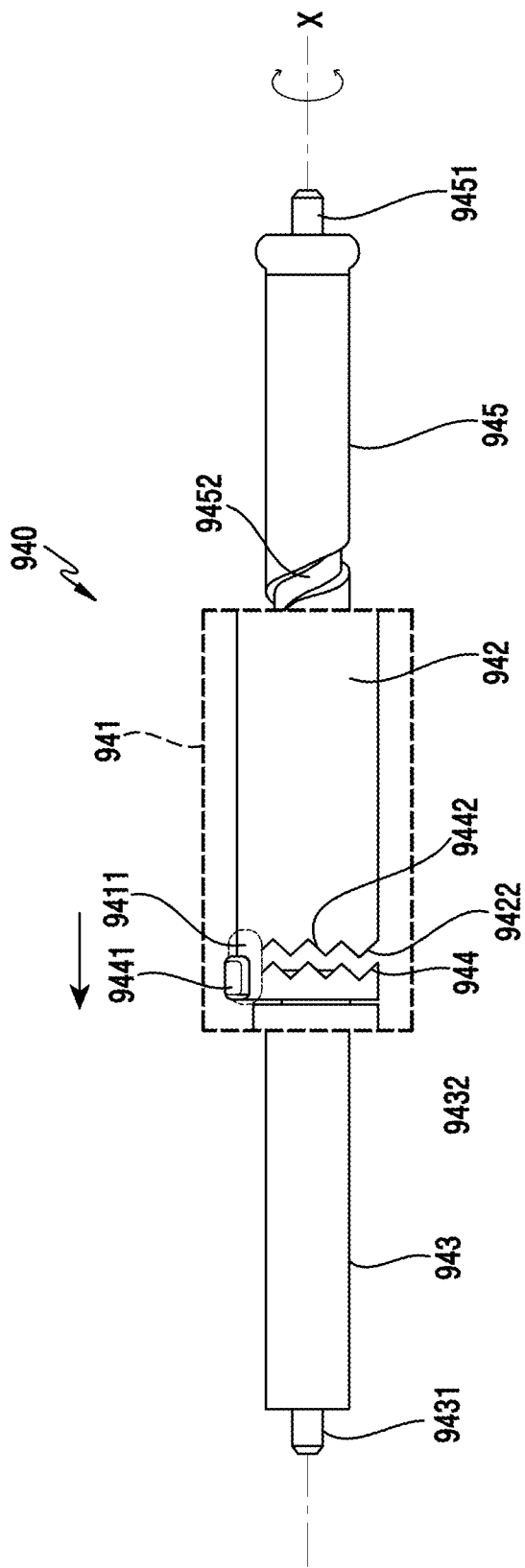
FIG. 9B is a view of the mounting structure when data is input through the rotating member, according to an embodiment of the present disclosure.

FIG. 9B is a view of the mounting structure when data is input through the rotating member, according to an embodiment of the present disclosure.

The mounting structure 940 of FIG. 9B may be similar to the mounting structure 840 of FIGS. 8A and 8B or may include other aspects of a mounting structure found in the present disclosure.

Referring to FIG. 9B, when the lever 9441 of the clutch 944 exposed through the lever through-hole 9411 in the rotating member 941 is moved in the direction of the horizontal arrow beside the mounting structure 940, the saw teeth 9442 of the clutch 944 and the saw teeth 9422 of the inner housing 942 can be maintained in a disengaged state. In this case, when the rotating member 941 is rotated, the lever 9441 exposed through the rotating member 941 is rotated therewith, so the clutch 944 is rotated therewith but the inner housing 942, disengaged from the clutch 944, is not rotated. Accordingly, when the rotating member 941 is rotated, the second rod 945 cannot be moved along the X-axis. Idle rotation of the rotating member 941 can be converted into a rotational parameter by a sensing member (i.e., 1102 in FIG. 11B) of an electronic device for sensing a sensed member (i.e., 1131 in FIG. 11C) provided on the rotating member 941, to be described below, and can then be used for data input.

Figure 10:
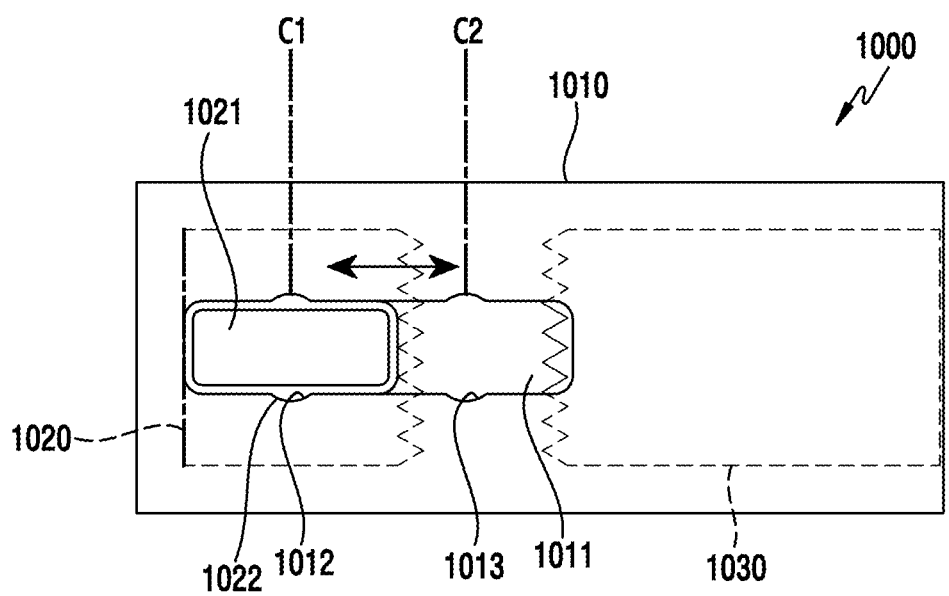
FIG. 10 is a view of the operation configuration of a clutch of a mounting structure, according to an embodiment of the present disclosure.

FIG. 10 is a view of the operation configuration of a clutch of a mounting structure, according to an embodiment of the present disclosure.

A mounting structure 1000 of FIG. 10 may be similar to the mounting structure 840 of FIGS. 8A and 8B or the mounting structure 940 of FIGS. 9A and 9B, or may include other aspects of a mounting structure found in the present disclosure.

Referring to FIG. 10, the mounting structure 1000 includes a locking structure that is locked in position after a clutch 1020 is moved left or right. A lever 1021 of the clutch 1020 may have at least one locking projection 1022 formed on the outer side thereof. At least one locking groove 1012 and 1013 may be formed inside the lever through-hole 1011 of the rotating member 1010. The locking grooves may include a first locking groove 1012 and a second locking groove 1013 spaced a predetermined distance apart from the first locking groove 1012.

When the lever 1021 is positioned at a first position C1 of the lever through-hole 1011 (i.e., a position where the clutch 1020 is separated from an inner housing 1030), the locking projection 1022 is locked in the first locking groove 1012, so the position is fixed. When the lever 1021 is positioned at a second position C2 of the lever through-hole 1011 (i.e., a position where the clutch 1020 is operated together with the inner housing 1030), the locking projection 1022 can be locked in the second locking groove 1013. The first locking groove 1012 and the second locking groove 1013 can prevent the clutch 1020 from freely moving by maintaining the position of the locking projection 1022 of the lever 1021 until a predetermined force for moving the lever 1021 is provided.

Figure 11A:
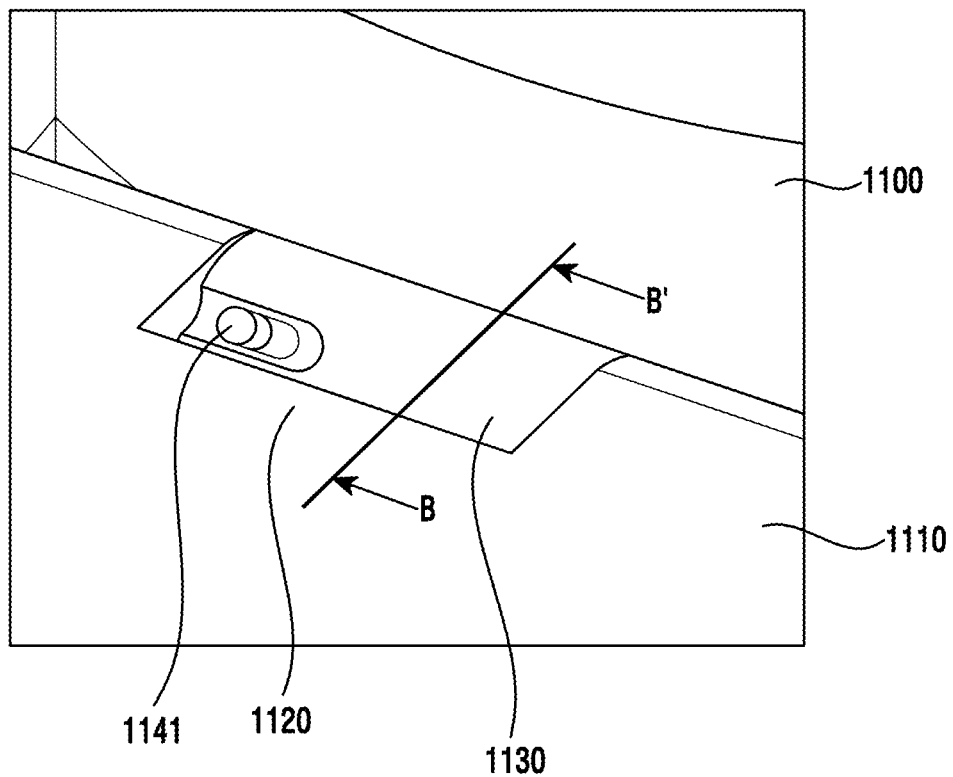
FIG. 11A is a view of the state in which a band is mounted to a housing by a mounting structure, according to an embodiment of the present disclosure.
Figure 11B:
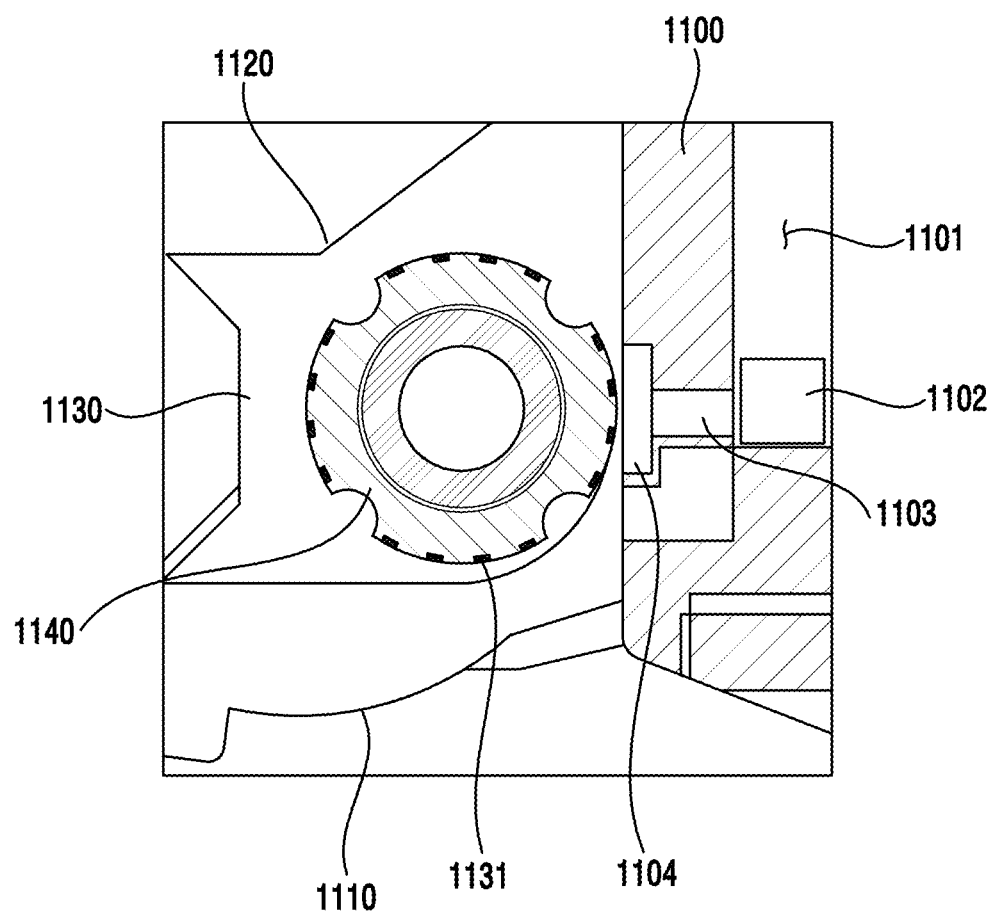
FIG. 11B is a cross-sectional view taken along line B-B' in FIG. 11A, according to an embodiment of the present disclosure.
Figure 11C:
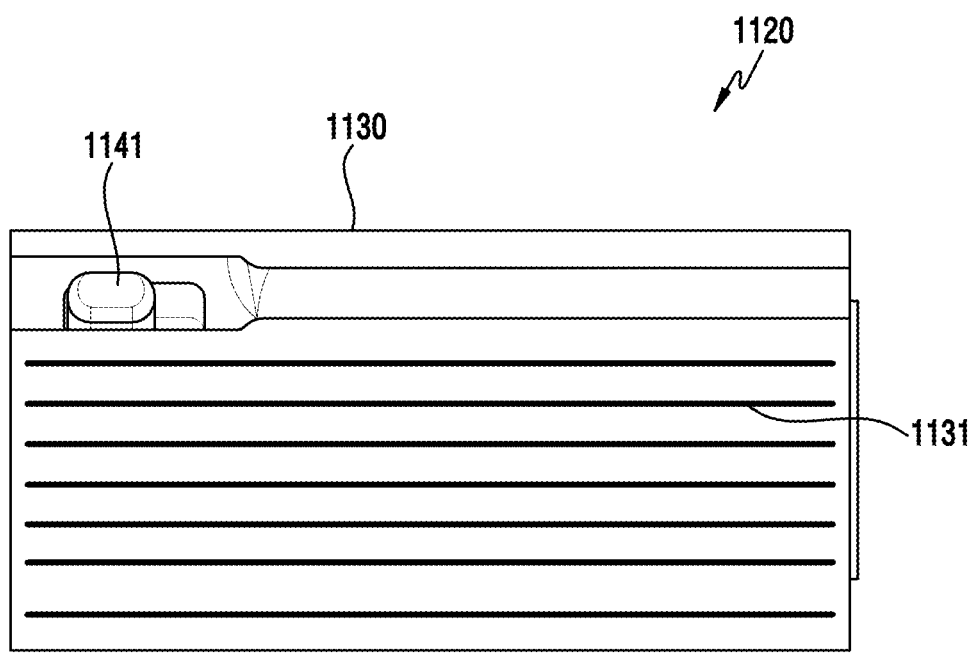
FIG. 11C is a view of a rotating member having a detected mark, according to an embodiment of the present disclosure.

FIG. 11A is a view of the state in which a band is mounted to a housing by a mounting structure, according to an embodiment of the present disclosure. FIG. 11B is a cross-sectional view taken along line B-B' in FIG. 11A, according to an embodiment of the present disclosure. FIG. 11C is a view of a rotating member having a detected mark, according to an embodiment of the present disclosure.

A mounting structure 1120 of FIGS. 11A to 11C may be similar to the mounting structure 840 of FIGS. 8A and 8B, the mounting structure 940 of FIGS. 9A and 9B, or the mounting structure 1000 of FIG. 10, or may include other aspects of a mounting structure found in the present disclosure.

Referring to FIG. 11A, a first band 1110 is fastened to a housing 1100 and includes the mounting structure 1120. The mounting structure 1120 may include a rotating member 1130 positioned to be exposed from the first band 1110. A lever 1141 can be exposed outside the rotating member 1130, and when the lever 1141 is moved, the rotating member 1130 can perform at least some or all of the operations of fastening a band and inputting data.

When the rotating member 1130 performs the operation of inputting data, a housing of an electronic device may include a detecting member and the rotating member of the mounting structure 1120 may include a detected mark.

Referring to FIG. 11B, the first band 1110 including the mounting structure 1120 is fixed to the housing 1100. The mounting structure 1120 may include the rotating member 1130 and an inner housing 1140 that is selectively rotated in the rotating member 1130. The selective rotation of the inner housing 1140, by movement of a clutch, is the same as the above description.

The housing 1100 of an electronic device may include an optical sensor 1102 positioned in an internal space 1101. The optical sensor 1102 may be electrically connected with a processor of the electronic device. According to an exemplary embodiment, the optical sensor 1102 may include an optical finger mouse (OFM) sensor. The optical sensor 1102 can emit and receive light through a guide hole 1103 formed through the housing 1100 to communicate with the outside. The housing 1100 may include a window 1104 positioned to include the guide hole 1103. The window 1104 is positioned to be level with the outer side of the housing 1100, so the window 1104 can be positioned in a waterproof and dust-proof manner that prevents external water or dirt from entering the guide hole 1103.

A plurality of detected marks 1131 may be positioned at regular intervals around the outer circumferential surface of the rotating member 1130 of the mounting structure 1120. The detected marks 1131 may include sanding patterns, printed patterns, or physically formed patterns (formed by, for example, laser or computerized numerical control (CNC)) positioned at regular intervals around the outer circumferential surface of the rotating member 1130 for detection by the optical sensor 1102 positioned in the housing 1100.

As shown in FIG. 11C, an optical sensor (i.e., the optical sensor 1102) positioned in a housing (i.e., the housing 1100) may be positioned to emit/receive light toward/from the mounting structure 1120. A plurality of detected marks 1131 may be positioned at regular intervals around the outer circumferential surface of the rotating member 1130 of the mounting structure 1120. The detected marks 1131 may include sanding patterns positioned at regular intervals around the outer circumferential surface of the rotating member 1130. However, the present disclosure is not limited thereto, and the detected marks 1131 may be implemented in various ways that allow detection of a rotation of the rotating member 1130, depending on the kind of optical sensor 1102 that is applied as a detecting member.

Accordingly, when only the rotating member 1130, rather than an inner housing (i.e., the inner housing 1140), is rotated by movement of a clutch, an optical sensor (i.e., the optical sensor 1102) can obtain rotational parameters of the rotating member 1130 by detecting the detected marks 1131 positioned on the outer circumferential surface of the rotating member 1130 through the guide hole 1103. An electronic device can perform a corresponding function on the basis of the obtained parameters.

Figure 12:
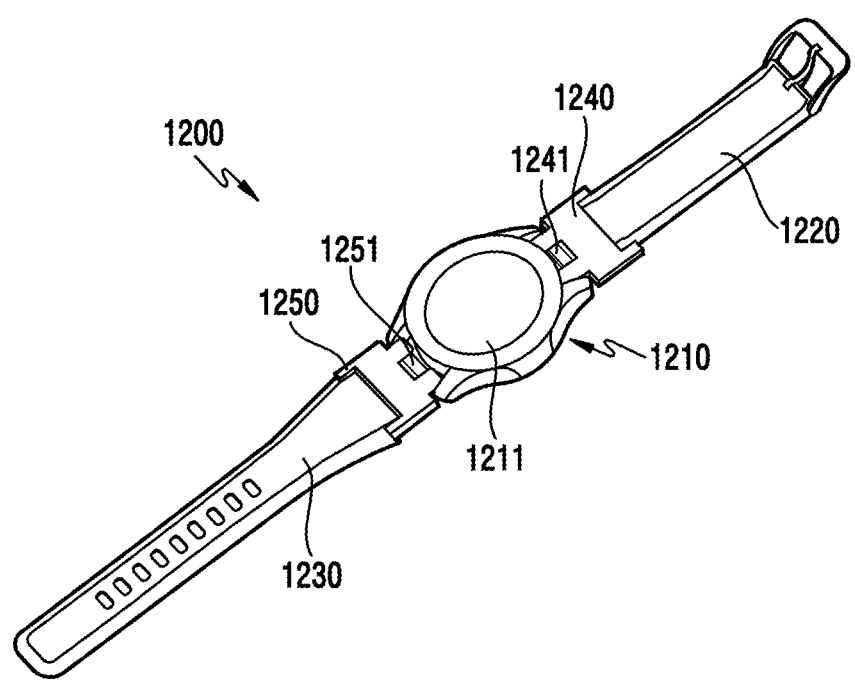
FIG. 12 is a perspective view of an electronic device including a mounting structure, according to an embodiment of the present disclosure.

FIG. 12 is a perspective view of an electronic device including a mounting structure, according to an embodiment of the present disclosure.

Mounting structures 1251 and 1241 of FIG. 12 may be similar to the mounting structure 840 of FIGS. 8A and 8B, the mounting structure 940 of FIGS. 9A and 9B, the mounting structure 1000 of FIG. 10, or the mounting structure 1120 of FIGS. 11A to 11C, or may include other aspects of mounting structures found in the present disclosure.

Referring to FIG. 12, an electronic device 1200 includes a housing 1210 including a display 1211, a first band 1220 fastened to an end of the housing 1210, and a second band 1230 fastened to the other end of the housing 1210. The electronic device 1200 includes a first adaptor 1240 (or a gender) interposed between the first band 1220 and the housing 1210. The electronic device 1200 may include a second adaptor 1250 interposed between the second band 1230 and the housing 1210.

The first band 1220 and the second band 1230 can be directly fastened to the housing of the electronic device 1200, separately, without an adaptor. The first band 1220 and the second band 1230 may be fastened to the housing 1210 of the electronic device 1200 using at least one of the first adaptor 1240 and the second adaptor 1250. When the electronic device 1200 is equipped with at least one adaptor of the pair of adaptors 1240 and 1250, mounting structures 1241 and 1251 for the adaptors can be detected.

The electronic device 1200 can detect a detected member (i.e., a magnet or a sanding pattern) included in the mounting structures 1241 and 1251 (i.e., rotating members) using a detecting member (i.e., a hall sensor or an optical sensor) provided therein. The electronic device 1200 (i.e., the processor 120 or the processor 210) can detect the number of mounted adaptors 1240 and 1250 and can perform various functions by obtaining rotational parameters of rotating members included in the mounting structures 1241 and 1251 of the adaptors 1240 and 1250 mounted at specific positions. The electronic device 1200 may perform corresponding functions (i.e., user experiences (UXs) in different modes), depending on the positions of the adaptors 1240 and 1250. The electronic device 1200 (i.e., the processor 120 or the processor 210) can perform a function of scrolling an image displayed on the display 1211 or showing a hidden notification, using the corresponding mounting structure 1241 or 1251 of the adaptor 1240 or 1250 applied to the first band 1220 or the second band 1230. When both the adaptors 1240 and 1250 are applied to the first band 1220 and the second band 1230, respectively, the electronic device 1200 (i.e., the processor 120 or the processor 210) may perform a function of zooming in or out of an image displayed on the display 1211, using the mounting structures 1241 and 1251. However, the present disclosure is not limited thereto and at least one of the mounting structures 1241 and 1251 may perform various input functions (i.e., a function of turning up/down volume and a mode change function) of the electronic device.

FIGS. 13A to 13E are configuration views of an electronic device when data is input by rotating a rotating member, according to embodiments of the present disclosure.

FIGS. 13A to 13E show embodiments of the present disclosure in which an electronic device detects rotational parameters of the rotating member included in at least one mounting structure of the mounting structures 340, 440, 640, 740, 840, 940, 1010, 1120, 1241, and 1251, described above, and performs corresponding functions using the detected rotational parameters. A first mounting structure and a second mounting structure to be described below may include mounting structures 1321 and 1331 having the same configuration as those of the mounting structures 340, 440, 640, 740, 840, 940, 1010, 1120, 1241, and 1251, described above.

Referring to FIGS. 13A to 13E, an electronic device 1300 includes a housing 1310 including a display 1311, a first band 1320 connected to an end of the housing 1310 by a first mounting structure 1321, and a second band 1330 positioned by a second mounting structure 1331. At least one of the first band 1320 and the second band 1330 may be directly connected to the housing 1310 without a mounting structure.

Figure 13A:
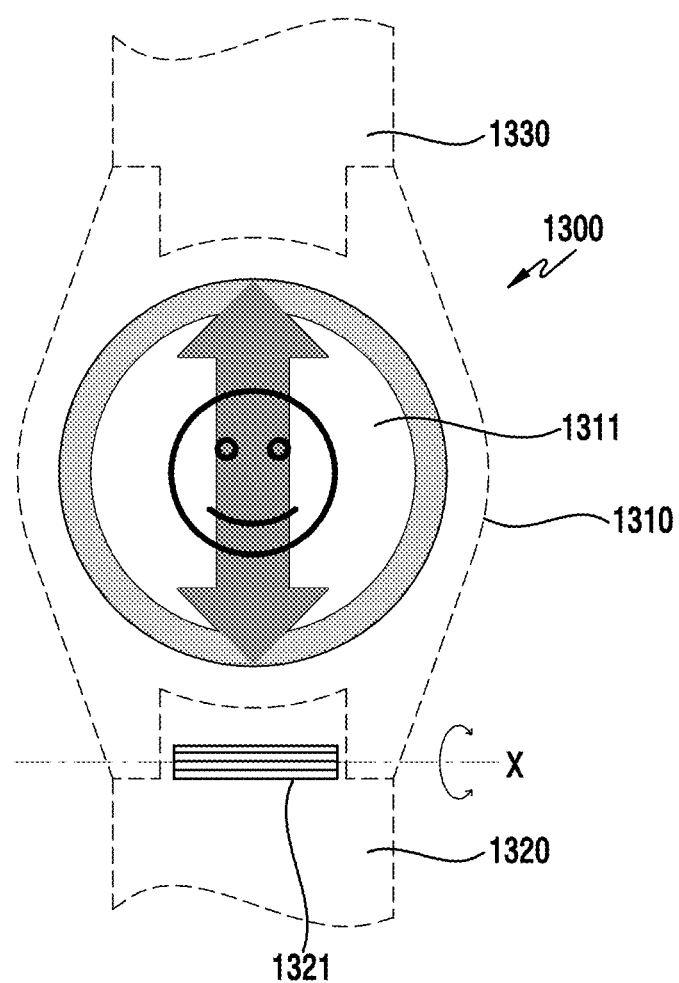
FIGS. 13A to 13E are configuration views of an electronic device when data is input by rotating a rotating member, according to an embodiment of the present disclosure.

FIG. 13A is a view of the state in which the first band 1320 has been connected to the housing 1310 by the first mounting structure 1321, and when the first mounting structure 1321 is rotated in a predetermined direction about an X-axis, the electronic device 1300 (i.e., the processor 120 or the processor 210) can scroll an image displayed on the display 1311 in the same direction as the rotational direction, or in a predetermined direction.

Figure 13B:
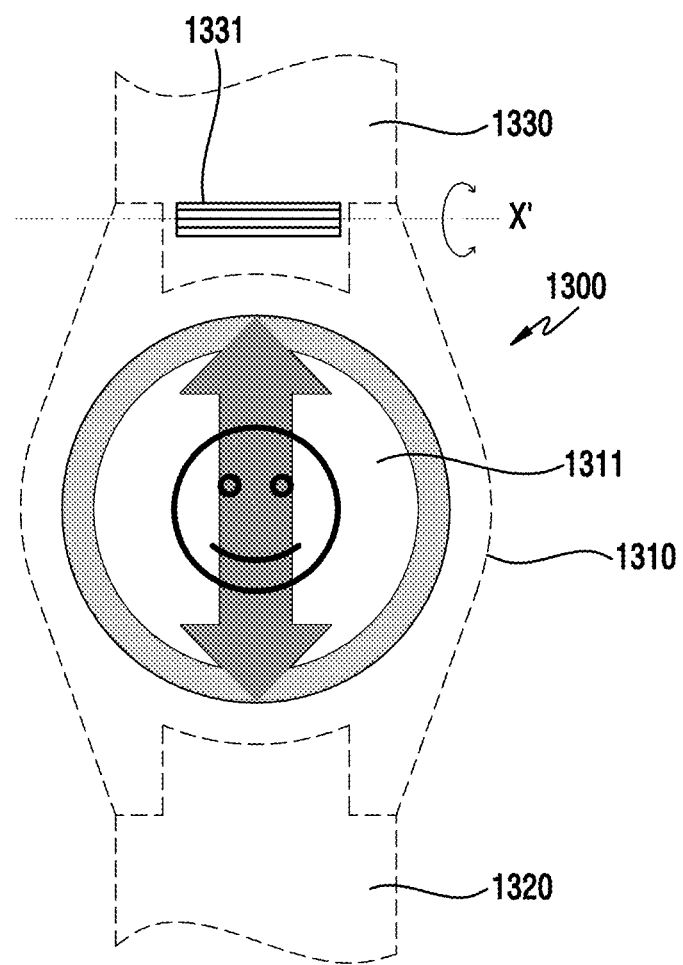

FIG. 13B is a view of the state in which the second band 1330 has been connected to the housing 1330 by the second mounting structure 1331, and when the second mounting structure 1331 is rotated in a predetermined direction about an X'-axis, the electronic device 1300 (i.e., the processor 120 or the processor 210) can scroll an image displayed on the display 1311 in the same direction as the rotational direction, or in a predetermined direction.

Figure 13C:
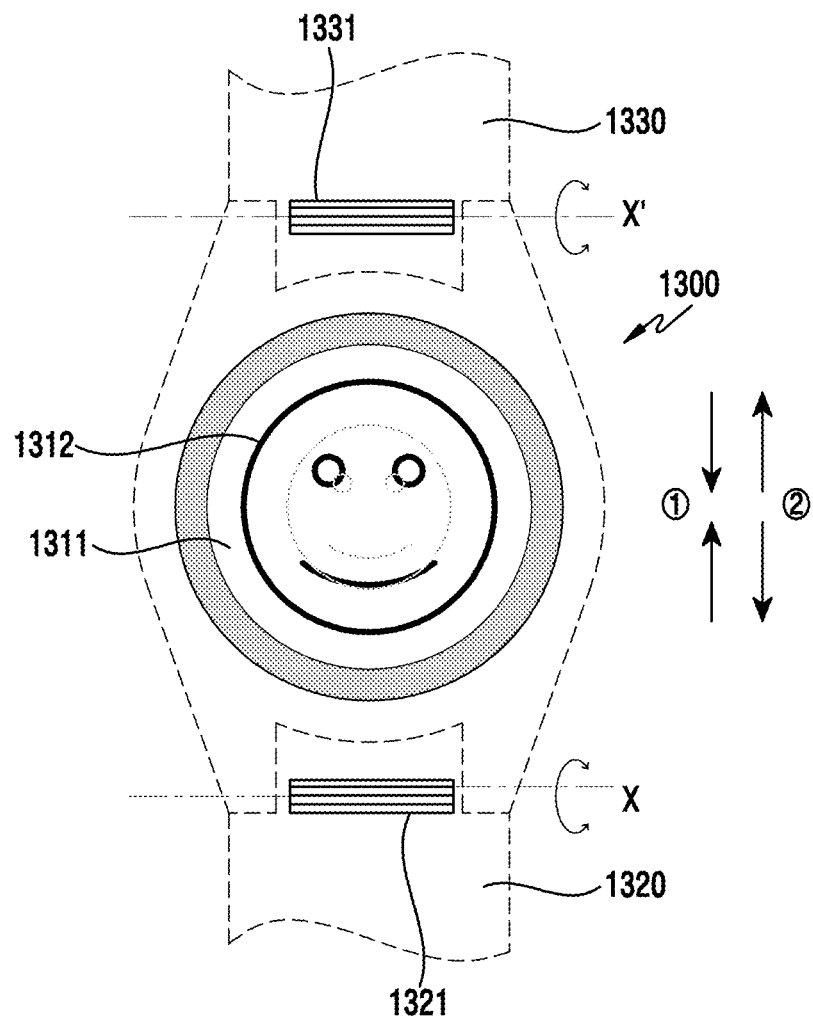

FIG. 13C is a view showing the state in which the first band 1320 has been connected to the housing 1310 by the first mounting structure 1321 and the second band 1330 has been connected to the housing 1330 by the second mounting structure 1331. The first mounting structure 1321 can be rotated in a predetermined direction about the X-axis and the second mounting structure 1331 can be rotated in a predetermined direction about the X'-axis. For example, when the first mounting structure 1321 and the second mounting structure 1331 are both rotated toward the housing (in the direction (1)), the electronic device 1300 (i.e., the processor 120 or the processor 210) can reduce the size of an object 1312 displayed on the display 1311. When the first mounting structure 1321 and the second mounting structure 1331 are both rotated opposite the direction toward the housing (in the direction (2)), the electronic device 1300 (i.e., the processor 120 or the processor 210) can enlarge the object 1312 displayed on the display 1311.

The first mounting structure 1321 and the second mounting structure 1331 may perform different operations. For example, the first mounting structure 1321 may perform a scroll function and the second mounting structure 1331 may perform a zooming operation.

Figure 13D:
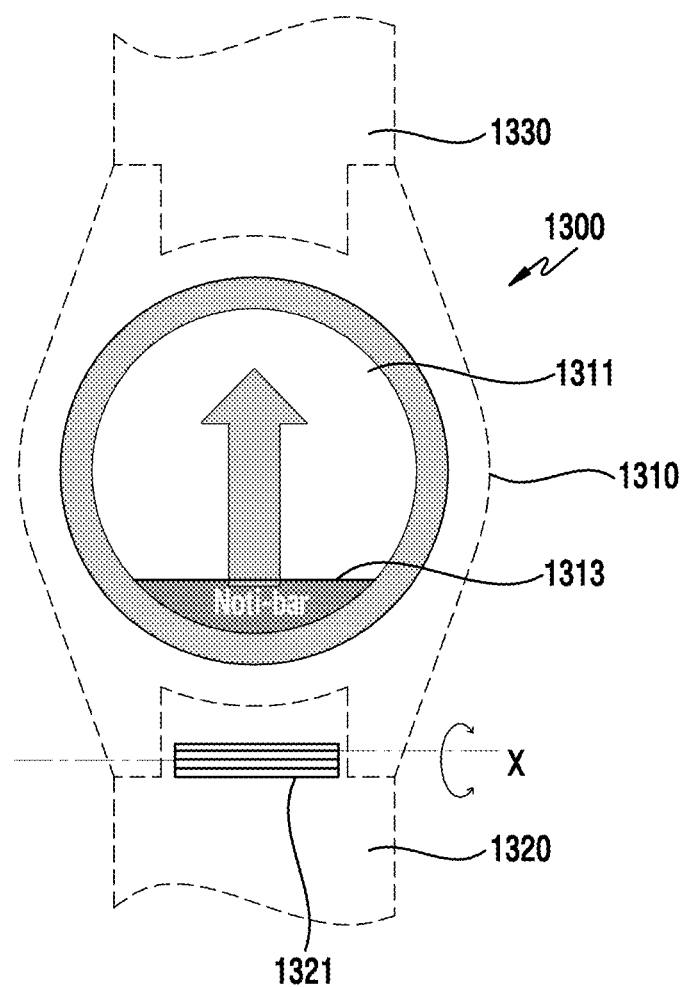

FIG. 13D is a view of the state in which the first band 1320 has been connected to the housing 1310 by the first mounting structure 1321, and when the first mounting structure 1321 is rotated in a predetermined direction about an X-axis, the electronic device 1300 (i.e., the processor 120 or the processor 210) can execute a quick panel by scrolling up a notification bar object 1313 displayed on the display 1311.

Figure 13E:
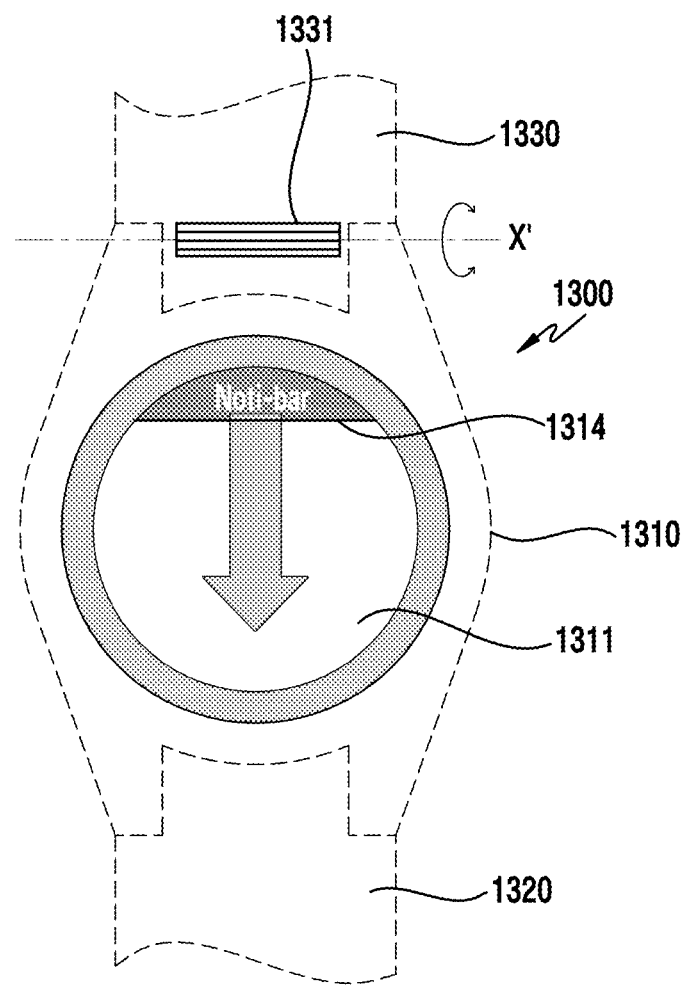

FIG. 13E is a view of the state in which the second band 1330 has been connected to the housing 1310 by the second mounting structure 1331, and when the second mounting structure 1331 is rotated in a predetermined direction about an X'-axis, the electronic device 1300 (i.e., the processor 120 or the processor 210) can execute a quick panel by scrolling down a notification bar object 1314 displayed on the display 1311.

A band mounting structure allows a user to easily fasten or detach a band.

A band mounting structure allows for data input to an electronic device merely through a simple operation, whereby convenience of operating the electronic device can be improved.

According to an aspect of the present disclosure, provided is an electronic device that includes: a housing including a first plate, a second plate facing away from the first plate, and a side member surrounding a space between the first plate and the second plate; a first band detachably mounted to the side member and shaped to wrap around a wrist of a user; a display exposed through the first plate; a processor positioned inside the space and electrically connected to the display; a memory positioned inside the space and electrically connected to the processor; and a mounting structure configured to connect the first band to the side member. The mounting structure includes: a recessed structure formed in the side member, the recessed structure having a first surface, a second surface facing the first surface, a first hole formed in the first surface, and a second hole formed in the second surface, and facing the first hole, in which an imaginary line extending from the first hole to the second hole defines a first axis; a rotating member positioned to rotate around the first axis, the rotating member having a through-hole that has an inner screw surface centered around the first axis; a first rod extending along the first axis through a first portion of the first band, the first rod having a first end inserted into the first hole, and a second end held by the rotating member such that the first rod does not move along the first axis while the rotating member rotates; and a second rod extending along the first axis through a second portion of the first band. The second rod has: a third end rotatably inserted into the second hole; and an external screw surface engaged with the inner screw surface of the rotating member such that the second rod moves along the first axis while the rotating member rotates.

The mounting structure may provide: a mounting state in which the first end of the first rod is inserted into the first hole and the third end of the second rod is inserted into the second hole, and a dismounting state in which the first end of the first rod is inserted into the first hole and the third end of the second rod is not inserted into the second hole, the second rod being configured to move along the first axis between the mounting state and the dismounting state.

The first portion and the second portion of the first band may together define a recess, and the rotating member may be positioned in the recess.

The first portion of the first band may have a first through-hole through which the first rod extends and the second portion may have a second through-hole through which the second rod extends.

The electronic device may further include a detection circuit configured to detect the rotation of the rotating member, and the memory may store instructions that, when executed, cause the processor to adjust the state of the electronic device in response to the detected rotation of the rotating member.

The state of the electronic device may be associated with operation of the display.

The detection circuit may include an optical sensor mounted on or in the side member.

At least one of sanding patterns, printed patterns, and physically formed patterns (i.e., laser and CNC) positioned to enable the optical sensor to detect a rotation of the rotating member may be provided in a corresponding area of the rotating member that corresponds to the optical sensor.

The detection circuit may include a hall sensor mounted on or in the side member.

At least one magnet may be positioned in an area of the rotating member that corresponds to the hall sensor.

According to an aspect of the present disclosure, provided is an electronic device that includes: a housing including a first plate, a second plate facing away from the first plate, and a side member surrounding a space between the first plate and the second plate; a first band detachably mounted to the side member and shaped to wrap around a wrist of a user; a display exposed through the first plate; a processor positioned inside the space and electrically connected to the display; a memory positioned inside the space and electrically connected to the processor; and a mounting structure configured to connect the first band to the side member. The mounting structure includes: a recessed structure formed in the side member, the recessed structure having a first surface, a second surface facing the first surface, a first hole formed in the first surface, and a second hole formed in the second surface, and facing the first hole, in which an imaginary line extending from the first hole to the second hole defines a first axis; a rotating member positioned to rotate around the first axis, the rotating member having a through-hole and a lever through-hole formed to the outside from the through-hole; an inner housing positioned in the through-hole of the rotating member to rotate about the first axis and having a through-hole having an inner screw surface around the first axis; a first rod extending along the first axis through a first portion of the first band, the first rod having a first end inserted into the first hole and a second end extending toward the inner housing such that the first rod does not move along the first axis while the rotating member rotates; a clutch interposed between the first rod and the inner housing, the clutch having a lever partially exposed through the lever through-hole in the rotating member, and allowing or stopping rotation of the inner housing by being selectively coupled to the inner housing, depending on operation of the lever; and a second rod extending along the first axis through a second portion of the first band. The second rod has: a third end rotatably inserted into the second hole; and an external screw surface engaged with the inner screw surface in the inner housing such that the second rod moves along the first axis while the inner housing rotates.

The inner housing may be rotated with the rotating member by engagement of a plurality of saw teeth at the clutch toward the inner housing and a plurality of saw teeth formed at the inner housing.

The mounting structure may provide, when the clutch is coupled to the inner housing, a mounting state in which the first end of the first rod is inserted into the first hole and the third end of the second rod is inserted into the second hole, and a dismounting state in which the first end of the first rod is inserted into the first hole and the third end of the second rod is not inserted into the second hole.

The mounting structure may provide a data input state in which rotational parameters based on rotation of the rotating member are provided to the electronic device with the clutch decoupled from the inner housing.

The lever may have a locking structure that locks the clutch at a first position where the clutch is coupled to an outer housing and a second position where the clutch is decoupled from the outer housing.

The locking structure may include locking grooves formed at a first position and the second position of the lever through-hole and locking projections formed on the lever to be locked into the locking grooves.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. An electronic device comprising:
a housing including a first plate, a second plate facing away from the first plate, and a side member surrounding a space between the first plate and the second plate;
a first band detachably mounted to the side member and shaped to wrap around a wrist of a user;
a display exposed through the first plate;
a processor positioned inside the space and electrically connected to the display;
a memory positioned inside the space and electrically connected to the processor; and
a mounting structure configured to connect the first band to the side member,
wherein the mounting structure includes:
a recessed structure formed in the side member, wherein the recessed structure includes a first surface, a second surface facing the first surface, a first hole formed in the first surface, and a second hole formed in the second surface, and facing the first hole, wherein an imaginary line extending from the first hole to the second hole defines a first axis;
a rotating member positioned to rotate around the first axis, the rotating member including a through-hole that includes an inner screw surface centered around the first axis;
a first rod extending along the first axis through a first portion of the first band, the first rod including a first end inserted into the first hole and a second end held by the rotating member such that the first rod does not move along the first axis while the rotating member rotates; and
a second rod extending along the first axis through a second portion of the first band, the second rod including:
a third end rotatably inserted into the second hole, and
an external screw surface engaged with the inner screw surface of the rotating member such that the second rod moves along the first axis while the rotating member rotates.

2. The device of claim 1, wherein the mounting structure provides:
a mounting state in which the first end of the first rod is inserted in the first hole and the third end of the second rod is inserted in the second hole, and
a dismounting state in which the first end of the first rod is inserted in the first hole and the third end of the second rod is not inserted in the second hole,
wherein the second rod is configured to move along the first axis between the mounting state and the dismounting state.

3. The device of claim 1, wherein the first portion and the second portion of the first band together define a recess, and wherein the rotating member is positioned in the recess.

4. The device of claim 3, wherein the first portion of the first band includes a first through-hole through which the first rod extends, and wherein the second portion includes a second through-hole through which the second rod extends.

5. The device of claim 1, further comprising a detection circuit configured to detect rotation of the rotating member, wherein the memory stores instructions that, when executed, cause the processor to adjust a state of the electronic device in response to the detected rotation of the rotating member.

6. The device of claim 5, wherein the state of the electronic device is associated with an operation of the display.

7. The device of claim 5, wherein the detection circuit includes an optical sensor mounted on or in the side member.

8. The device of claim 7, wherein at least one of sanding patterns, printed patterns, and physically formed patterns, including laser and computerized numerical control (CNC) formed patterns, positioned to enable the optical sensor to detect rotation of the rotating member, are provided at a corresponding area of the rotating member that corresponds to the optical sensor.

9. The device of claim 5, wherein the detection circuit includes a hall sensor mounted on or in the side member.

10. The device of claim 9, wherein at least one magnet is positioned in a corresponding area of the rotating member that corresponds to the hall sensor.

11. An electronic device comprising:
a housing including a first plate, a second plate facing away from the first plate, and a side member surrounding a space between the first plate and the second plate;
a first band detachably mounted to the side member and shaped to wrap around a wrist of a user;
a display exposed through the first plate;
a processor positioned inside the space and electrically connected to the display;
a memory positioned inside the space and electrically connected to the processor; and
a mounting structure configured to connect the first band to the side member,
wherein the mounting structure includes:
a recessed structure formed in the side member, the recessed structure having a first surface, a second surface facing the first surface, a first hole formed in the first surface, and a second hole formed in the second surface, and facing the first hole, in which an imaginary line extending from the first hole to the second hole defines a first axis;
a rotating member positioned to rotate around the first axis, the rotating member having a through-hole and a lever through-hole formed to the outside from the through-hole; an inner housing positioned in the through-hole in the rotating member to rotate about the first axis and having a through-hole having an inner screw surface around the first axis;
a first rod extending along the first axis through a first portion of the first band, the first rod having a first end inserted into the first hole and a second end extending toward the inner housing such that the first rod does not move along the first axis while the rotating member rotates;
a clutch interposed between the first rod and the inner housing, the clutch having a lever partially exposed through the lever through-hole in the rotating member and allowing or stopping rotation of the inner housing by being selectively coupled to the inner housing, depending on operation of the lever; and
a second rod extending along the first axis through a second portion of the first band, wherein the second rod has:
a third end rotatably inserted into the second hole; and
an external screw surface engaged with the inner screw surface of the inner housing such that the second rod moves along the first axis while the inner housing rotates.

12. The device of claim 11, wherein the inner housing is rotated with the rotating member by engagement of a plurality of saw teeth at the clutch toward the inner housing and a plurality of saw teeth formed at the inner housing.

13. The device of claim 11, wherein the mounting structure provides, when the clutch is coupled to the inner housing, a mounting state in which the first end of the first rod is inserted into the first hole and the third end of the second rod is inserted into the second hole, and a dismounting state in which the first end of the first rod is inserted into the first hole and the third end of the second rod is not inserted into the second hole.

14. The device of claim 11, wherein the mounting structure provides a data input state in which rotational parameters by rotation of the rotating member are provided to the electronic device with the clutch decoupled from the inner housing.

15. The device of claim 11, further comprising a detection circuit configured to detect the rotation of the rotating member,
wherein the memory stores instructions that, when executed, cause the processor to adjust a state of the electronic device in response to the detected rotation of the rotating member.

16. The device of claim 15, wherein the detection circuit includes an optical sensor mounted on or in the side member.

17. The device of claim 16, wherein sanding patterns are printed in a corresponding area of the rotating member that corresponds to the optical sensor to enable the optical sensor to detect rotation of the rotating member.

18. The device of claim 15, wherein the state of the electronic device is associated with an operation of the display.

19. The device of claim 11, wherein the lever has a locking structure that locks the clutch at a first position where the clutch is coupled to an outer housing and a second position where the clutch is decoupled from the outer housing.

20. The device of claim 19, wherein the locking structure includes locking grooves formed at the first position and the second position of the lever through-hole and locking projections formed on the lever to be locked into the locking grooves.

* * * * *